US010725787B1

(12) United States Patent
Parkes et al.

(10) Patent No.: US 10,725,787 B1
(45) Date of Patent: Jul. 28, 2020

(54) DATAPATH GRAPHS WITH OPERATIONS PERFORMED USING DIMENSIONS

(71) Applicant: Ascension Labs, Inc., East Palo Alto, CA (US)

(72) Inventors: Steven M. Parkes, Palo Alto, CA (US); Hwa-Chow Hsu, Mountain View, CA (US); Kyumin Kim, San Jose, CA (US); Leonardo Marchetti, San Francisco, CA (US); Andrey Siunov, Sunnyvale, CA (US)

(73) Assignee: Ascension Labs, Inc., Palo Alto, CA (US)

( * ) Notice: Subject to any disclaimer, the term of this patent is extended or adjusted under 35 U.S.C. 154(b) by 289 days.

(21) Appl. No.: 15/824,596

(22) Filed: Nov. 28, 2017

(51) Int. Cl.
*G06F 9/38* (2018.01)
*G06F 16/27* (2019.01)
*G06F 16/901* (2019.01)
*H04L 29/08* (2006.01)

(52) U.S. Cl.
CPC ............ *G06F 9/3885* (2013.01); *G06F 16/27* (2019.01); *G06F 16/9024* (2019.01); *G06F 2212/1016* (2013.01); *H04L 67/1097* (2013.01)

(58) Field of Classification Search
USPC ......................................................... 707/783
See application file for complete search history.

(56) References Cited

U.S. PATENT DOCUMENTS

| | | | | |
|---|---|---|---|---|
| 4,720,898 A | * | 1/1988 | Calfo ....................... | G21C 7/08 29/33 K |
| 7,627,498 B1 | * | 12/2009 | Walker ................... | G06Q 30/02 705/26.1 |
| 8,375,056 B2 | * | 2/2013 | Iorio .................... | G06F 12/1458 707/783 |
| 8,850,180 B2 | * | 9/2014 | Fein ........................ | H04L 63/04 713/150 |
| 2002/0062244 A1 | * | 5/2002 | Brady .................... | G06Q 30/02 705/14.38 |
| 2010/0058049 A1 | * | 3/2010 | Fein ........................ | H04L 63/04 713/150 |
| 2019/0102826 A1 | * | 4/2019 | Rohrssen ........... | G06Q 30/0641 |

* cited by examiner

*Primary Examiner* — Kim T Nguyen
(74) *Attorney, Agent, or Firm* — Van Pelt, Yi & James LLP

(57) ABSTRACT

An operation associated with an artifact which includes a plurality of fragments is received. A dimension is obtained and a plurality of sub-operations is generated based at least in part on the operation and the dimension where each of the plurality of sub-operations is associated with a subset of values associated with the dimension. The plurality of sub-operations is performed on the plurality of fragments, including by generating, for each of the plurality of fragments, dimensional metadata which includes a subset of values associated with the dimension for that fragment.

25 Claims, 21 Drawing Sheets

|  302  |  304  |  306  |  308  |
|---|---|---|---|
| Customer Info | Purchase Info | Store Info | May 1, 2017 10:03 |
| Customer Info | Purchase Info | Store Info | May 1, 2017 10:21 |
| Customer Info | Purchase Info | Store Info | May 1, 2017 10:46 |
| Customer Info | Purchase Info | Store Info | May 1, 2017 10:58 |

Input Fragment 1 (300)

| | | | |
|---|---|---|---|
| Customer Info | Purchase Info | Store Info | May 1, 2017 11:05 |
| Customer Info | Purchase Info | Store Info | May 1, 2017 11:10 |
| Customer Info | Purchase Info | Store Info | May 1, 2017 11: 31 |
| Customer Info | Purchase Info | Store Info | May 1, 2017 11:54 |

Input Fragment 2 (320)

342

| | | | |
|---|---|---|---|
| Customer Info | Purchase Info | Store Info | May 1, 2017 11:57 |
| Customer Info | Purchase Info | Store Info | May 1, 2017 12:06 |
| Customer Info | Purchase Info | Store Info | May 1, 2017 12: 24 |
| Customer Info | Purchase Info | Store Info | May 1, 2017 12:40 |

Input Fragment 3 (340)

FIG. 3

Column Used as Dimension (1902)    1904

| ... | May 1, 2017 10:00:05 | ... |
| ... | May 1, 2017 10:00:22 | ... |
| ⋮ | ⋮ | ⋮ |
| ... | May 1, 2017 10:59:37 | ... |

1906

Log 1 (1900)

Column Used as Dimension (1912)    1914

| ... | May 1, 2017 11:00:06 | ... |
| ... | May 1, 2017 11:00:08 | ... |
| ⋮ | ⋮ | ⋮ |
| ... | May 1, 2017 11:59:51 | ... |

1916

Log 2 (1910)

Column Used as Dimension (1922)    1924

| ... | May 1, 2017 11:59:56 | ... |
| ... | May 1, 2017 12:00:13 | ... |
| ⋮ | ⋮ | ⋮ |
| ... | May 1, 2017 12:59:56 | ... |

1926

Log 3 (1920)

FIG. 19

DATAPATH GRAPHS WITH OPERATIONS PERFORMED USING DIMENSIONS

BACKGROUND OF THE INVENTION

Datapath graphs are a type of system which input or process big data (i.e., extremely large amounts of data, for example on the order of terabytes or even petabytes of data currently). Big data which is input by a datapath graph often originates from a "live" or active system or network, such that the datapath graphs periodically receive new, incoming pieces of data. As a result, the datapath graph often needs to perform an update so that whatever reporting, analyzing, or (more generally) processing performed by the datapath graph is up to date. This can take a significant amount of time given the large amount of data. Some other systems which input or process big data attempt to reduce this processing time, but the performance improvement comes at the expense of accuracy. New techniques or systems that produce results quickly without sacrificing accuracy would be desirable.

BRIEF DESCRIPTION OF THE DRAWINGS

Various embodiments of the invention are disclosed in the following detailed description and the accompanying drawings.

FIG. 3 is a diagram illustrating an embodiment of fragments in an artifact.

FIG. 19 is a diagram illustrating an embodiment of a process to determine a span associated with a plurality of sub-operations.

DETAILED DESCRIPTION

Figure 1:
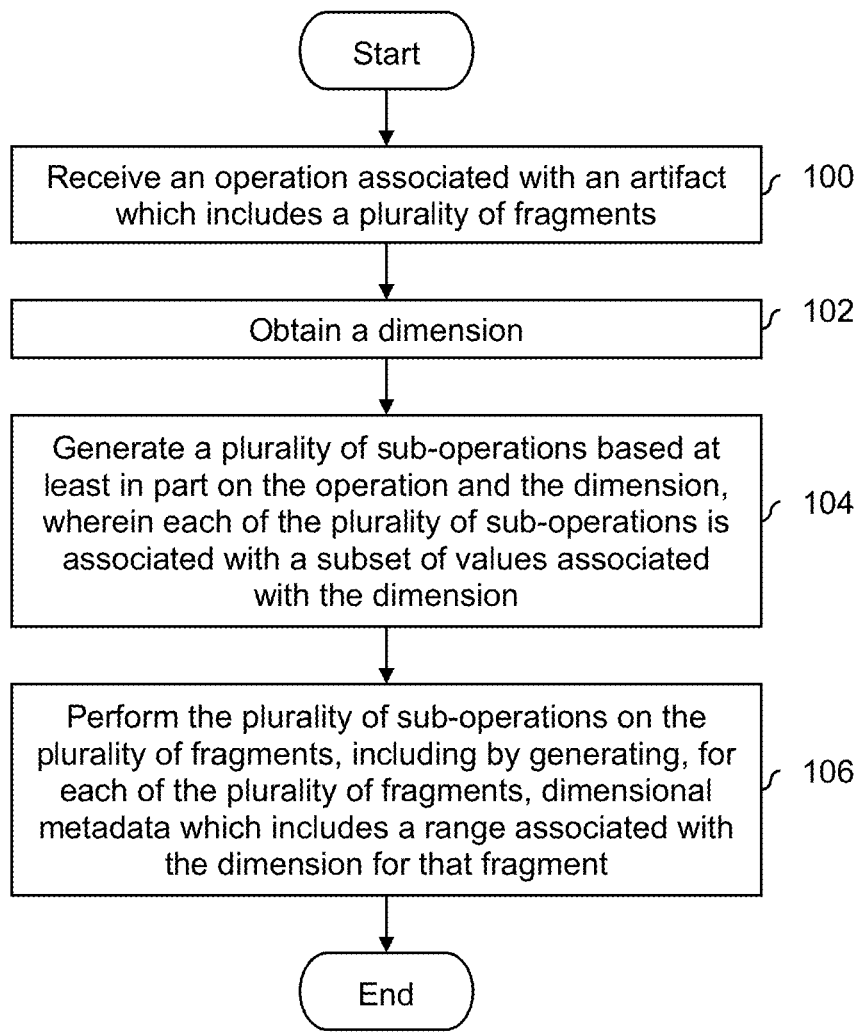
FIG. 1 is a flowchart illustrating an embodiment of a process to perform an operation on an artifact in a datapath graph using a dimension.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique to perform an operation on an artifact in a datapath graph using a dimension are described herein. An operation associated with an artifact which includes a plurality of fragments is received. For example, a fragment may be a file on a cloud file system (e.g., Google Cloud Platform, Amazon Simple Storage Service (S3), etc.) or a table in a cloud database (e.g., Google BigQuery, Amazon Athena, etc.). For example, the operation may relate to report generation and/or analysis of big data. The big data may (as an example) relate to interactions with social media or purchases on some website. A dimension is obtained and a plurality of sub-operations is generated based at least in part on the operation and the dimension. For example, the dimension may be a column in the fragment(s). Each of the plurality of sub-operations is associated with a range associated with the dimension. For example, if the dimension is associated with time, then a given sub-operation may be associated with a range of time to through time ti. The plurality of sub-operations are performed on the plurality of fragments, including by generating, for each of the plurality of fragments, dimensional metadata which includes a range associated with the dimension for that fragment. For example, the dimensional metadata may permit the system to know what fragments correspond to what sub-operations. Since new fragments are always arriving, this can reduce the amount of processing performed and/or the amount of information downloaded. The following figures describe various examples of this.

FIG. 1 is a flowchart illustrating an embodiment of a process to perform an operation on an artifact in a datapath graph using a dimension. In some embodiments, the process of FIG. 1 is performed by a scheduler associated with a datapath graph. A scheduler may detect when some part of the datapath graph is out of date and needs to be updated (e.g., in response to new data arriving at a source to the datapath graph or as that new data is propagated through the datapath graph).

At 100, an operation associated with an artifact which includes a plurality of fragments is received. In one example, a datapath graph performs one or more operations associated with data reporting, data analysis, data manipulation, and/or data processing to be performed on big data and the operation received at step 100 is a user-specified operation to that end. For example, the big data may relate to user interaction with social media and the operation may be analytics related, such as generating a number of monthly visitors or a number of monthly active users grouped by month. For example, a broad specification (e.g., "for all time, grouped by month") is received. At least some operations can be performed on subsets of data (e.g., grouped into various date ranges) and that much of those subsets don't change when new data comes in (e.g., since the newly arrived only affects a relatively small amount of time and so older groups or bins of data will tend to not receive a new piece of data.)

In one example, the artifact and fragments comprise intermediate data generated and/or stored by the datapath graph somewhere between the inputs of the datapath graph (e.g., sources) and the outputs of the datapath graph (e.g., sinks). To continue the example from above, if the operation is associated with determining a number of monthly visitors to some social media, then the associated artifact and/or fragments would include information used to generate that value (e.g., user IDs of all visitors, timestamps of visits, type of interaction, etc.).

Artifacts may be used to group fragments which are associated with a given operation and/or intended sink. For example, if there is one operation which calculates the number of monthly visitors and another operation which calculates the number of monthly active users, then there may be one artifact with fragments (e.g., intermediate data) for the first operation and another artifact with fragments (e.g., intermediate data) for the second operation. Or, one artifact may include fragments which are destined for one sink (i.e., output) and another artifact includes fragments which are destined for another sink.

At 102, a dimension is obtained. In some embodiments, the dimension is associated with a row or column in the fragments or some other table or database which has rows and columns. Although the operation which is received at 100 may be performed as-is on the artifact and/or fragments, it is not the most efficient and/or fastest way of inputting and processing big data with never-ending updates. To that end, a dimension is used to more efficiently perform the operation as will be described in more detail below.

In some embodiments the dimension is obtained by (e.g., automatically) determining it, for example by analyzing the artifact, fragments, and/or operation. This may be attractive because it does not require user input and/or prevents the selection of a bad or poor dimension due to (as an example) a user's failure to completely understand or comprehend all of the data. A higher quality or more optimal dimension (e.g., produced by analyzing the artifact, fragments, and/or operation) may in turn produce faster and/or more efficient processing.

In some embodiments, the dimension is specified, for example by an expert user and/or system administrator. This may be attractive when a platform or interface associated with the datapath graph is still being developed because the code to (e.g., automatically) determine the dimension does not need to be implemented. In some embodiments, the dimension is specified not by a user but by an upstream node in the datapath graph. For example, a dimension may be determined near the inputs (e.g., sources) of the datapath graph and then propagated downstream toward the outputs (e.g., sinks) of the datapath graph. This may be attractive because it enforces consistency within the datapath graph (e.g., which may result in more efficient and/or streamlined processing from beginning to end) and/or eliminates duplicate decision making about what dimension to use.

Alternatively, in some embodiments, a dimension is specified by a downstream node. For example, suppose there is some later (e.g., downstream) processing step which can be done more efficiently if the data were already partitioned according to a particular dimension. In some embodiments, that dimensional information (e.g., what partition makes processing efficient for the downstream node) is propagated upstream. This produces a different execution plan which makes the downstream execution better and results in the overall execution being better. In some embodiments, a new node and/or new sub-operation (e.g., associated strictly with transforming the portioning from one type of partition (e.g., date-based) to another type of partition (e.g., user-based) is inserted to do this transformation of portioning.

At 104, a plurality of sub-operations is generated based at least in part on the operation and the dimension, wherein each of the plurality of sub-operations is associated with a subset of values associated with the dimension. In one example, the subset of values is a range from a lowest value to a highest value where the range is applicable to a particular sub-operation. In another example the subset of values is an enumerated subset. For example, one (sub) set could include US and Canada and another (sub)set could include Mexico, another (sub)set could include England, Scotland, and Wales, etc. In some examples described below, the dimension is time (e.g., the fragments in those examples all include a column of time values) and each of the sub-operations is associated with or interested in events which occurred during a particular 1-hour block of time (e.g., the 10 o'clock hour, the 11 o'clock hour, etc.). In yet another example, the dimension is user-based.

At 106, the plurality of sub-operations is performed on the plurality of fragments, including by generating, for each of the plurality of fragments, dimensional metadata which includes a range associated with the dimension for that fragment. For example, the dimensional metadata for fragments will enable the scheduler or other processor to know which sub-operations to perform on which fragments. In one example described below, the dimensional metadata describes the range of times associated with or covered by each of the fragments. This enables the system to know which fragments are relevant to which sub-operations.

One benefit of a dimension is that it enables a large and/or monolithic operation (e.g., which inputs all available data) to be divided up into smaller and/or independent sub-operations operations (e.g., each of which only inputs some subset of the data). Thus, as new data comes in, only some of sub-operations have to be run instead of having to run the entire (e.g., large and/or monolithic) operation. Similarly, the amount of data which is ingested by the relevant sub-operations (e.g., which is/are being run at a particular update) may comprise only some of the data as opposed to all of the data. This may be useful if the artifacts and fragments are stored elsewhere and must be downloaded to the local device. In other words, the sub-operations permit the same result(s) to be produced as the original operation, but do so faster and without sacrificing the accuracy of the results.

It may be helpful to illustrate the process of FIG. 1 using a more detailed example. The following figures describe various examples of elements associated with FIG. 1.

Figure 2:
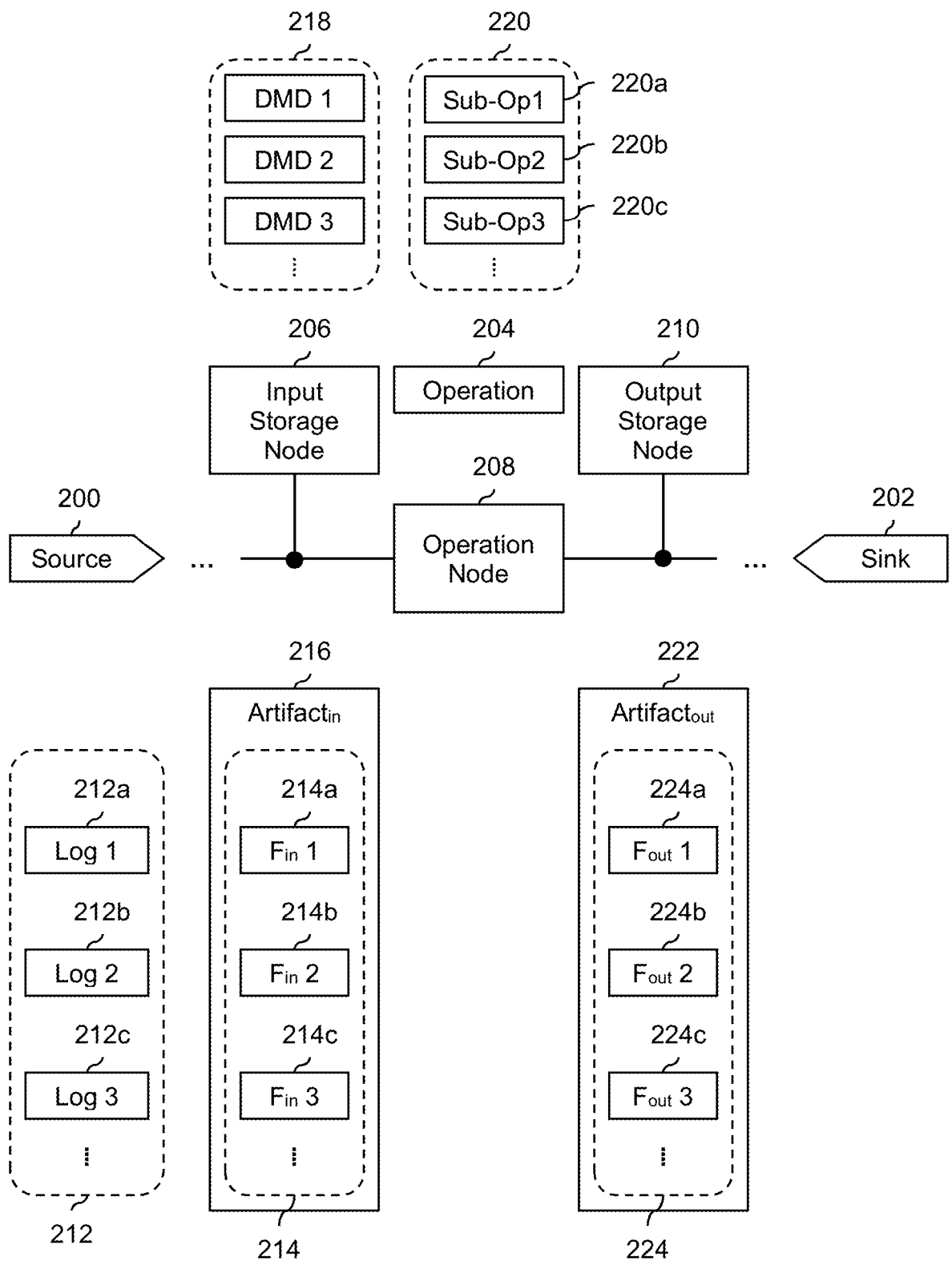
FIG. 2 is a diagram illustrating an embodiment of a datapath graph.

FIG. 2 is a diagram illustrating an embodiment of a datapath graph. In the example shown, the datapath graph receives data from one or more sources (e.g., source 200) and outputs transformed or processed data to one or more sinks (e.g., sink 202). The overall or overarching processing or transformation between source 200 and sink 202 is broken down into any number of smaller operations, such as operation 204, which contribute to or are otherwise a part of the overall transformation or process. The path between source 200 and sink 202 may therefore include any number of paths and/or storage nodes (e.g., which store intermediate metadata). For simplicity and ease of explanation, a simple exemplary portion of a datapath graph is shown here with an input storage node (206), operation node (208), and output storage node (210).

In this example, data enters the datapath graph from source 200 in the form of logs (212). For example, the source (200) may include or be associated with "live" or active services or processes which continuously generate logs. In one example, the logs record or reflect the interactions of users with some webpage (e.g., which sells one or more products), social media service, search portal, application, etc. The logs may record which user performed the interaction, which files or data were accessed, the type of access or operation performed, a timestamp, any error messages, any search terms or other inputs entered by the user, etc. In some embodiments, the logs are very large and constitute big data.

In this example, the logs are immutable or unchangeable, so once a log is created it is never subsequently modified. For example, at a first point in time, source 200 outputs a first log (212a). At a second point in time, source 200 outputs a second log (212b) which describes events which occurred at a later point in time compared to the first log (212a). To put it another way, the second log supplements the first log as opposed to replacing the first log and the first log is still relevant even after the arrival of the second log. After the second log is output by the source, a third log (212c) is output by the source (200) which describes still later events and so on and so forth.

For simplicity and ease of explanation, in this example, the inputs fragments (214) in the input artifact (216) have a one-to-one mapping or correspondence with the logs (212) which are output by the source (200). As a result, like the logs from which they originate, the inputs fragments (214) are immutable and arrive continuously at different times. For example, the first log (206a) arrives, which results in the first input fragment (214a). Next, the second log (206b) arrives, which results in the second input fragment (214b), and so on.

The information contained in a given input fragment (e.g., 214a) originates from one or more corresponding logs as processed per any intervening operations (e.g., between the source (200) and the input node (208), not shown). For example, if the relevant operation (204) is only interested in purchases, then some earlier filtering operation (not shown) may exclude user interactions in the logs (212) which did not result in a purchase from the input fragments (214) using a filtering operation. Or, if the operation is not interested in what type of web browser was used, then a web browser field or column in the logs (212) may be excluded from the input fragments (214).

The operation (204) and the dimension (in this example, time) are used to generate a plurality of sub-operations (220). In this example, dimensional metadata (218) is associated with input fragments (214). From the dimensional metadata (218), it can be determined which sub-operations (220) correspond to which fragments (214) and therefore which sub-operations (220) should be run when a new log or input fragment arrives. A more detailed example of this is described below.

The sub-operations (220) produce an output artifact (222) which includes a plurality of output fragments (224). In this example, each output fragment is generated by a corresponding sub-operation: the first output fragment (224a) is generated by the first sub-operation (220a), the second output fragment (224b) is generated by the second sub-operation (220b), etc. These output fragments are propagated downstream towards the sink (202) so that they become the input fragments for a subsequent and/or downstream operation (not shown). As described above, a dimension which is determined at this part of the datapath graph may (in some cases) be propagated or passed to downstream portions of the datapath graph so that those downstream operations and/or nodes do not have to duplicate the work to determine the dimension. In some embodiments, a (new) dimension is a function of one or more incoming dimensions (e.g., from upstream and/or downstream nodes), as well as the operation of the node.

In this example, the input storage node (206) and output storage node (210) only store metadata (e.g., dimensional metadata (218)) on a long term basis. Even though the artifacts (216 and 222) and fragments (214 and 224) are smaller (at least in this example) than the big data which they originate (e.g., fields and/or information which are not of interest to the relevant operation are excluded from the artifacts and fragments), the artifacts and fragments are still relatively large (at least in this example) and are therefore stored elsewhere on a long term basis (e.g., a cloud storage service such as Google's BigQuery or some other remote storage device). The input node requests any desired input fragments from the cloud storage service or other remote storage, stores the requested input fragments temporarily while they are being processed by the appropriate sub-operations, and then deletes the input fragments. Similarly, the output artifact (222) and output fragments (224) may be stored only temporarily on the output storage node (210) and are stored elsewhere (e.g., on cloud storage or some other remote storage) on a long term basis.

In some embodiments, the sub-operations (220) are SQL operations or queries. In some embodiments, data which is input to an SQL operation or query must be stored in some memory or storage which can be queried or otherwise read (e.g., as opposed to directly passing the input data to the operation node from some previous operation node without intervening storage). Storing (e.g., even temporarily) input fragments 214 in input storage node 206 will satisfy such a requirement. Once the (SQL) sub-operations have completed, the input fragments may be deleted from the input storage node.

In some embodiments, a complete datapath graph includes a complex arrangement of nodes and/or paths (e.g., in parallel, with nodes that branch out, with nodes that merge together, etc.). To put it another way, a datapath graph may include any number of sources, sinks, operation nodes, input storage nodes, and/or output storage nodes. In some embodiments, a datapath graph has no loops or looping paths (e.g., for design simplicity and/or ease of implementation). In some embodiments, a storage node is internally replicated to provide failure tolerance. Although not necessarily called out or explicitly described in examples below, this feature may be used in any implementation.

The following figure shows a more detailed example of input fragments.

FIG. 3 is a diagram illustrating an embodiment of fragments in an artifact. Fragments 300, 320, and 340 are an example of input fragments 214a-214c from FIG. 2. In this example, the input fragments contain purchase-related information where the rows in the fragments correspond to a particular purchase. The columns of the fragments in this example contain the following pieces of information for each purchase: customer information (302), such as a username, the customer's real name, a customer ID, etc.; purchase information (304), such as a description of the item(s) purchased, a quantity purchased, a barcode or serial number of the item(s) purchased, etc.; store information (306) such as a store number or location where the purchase occurred; and time and date information (308) such as when the purchase occurred. For ease of explanation, only a few columns and rows are shown here; a fragment may include any number of columns and rows and any type of information.

In this example, input fragment 300 is the first fragment received and it includes information associated with purchases which occurred during the 10 o'clock hour: 10:03, 10:21, 10:46, and 10:58. Later, a second fragment (320) is received which includes information for purchases in the 11 o'clock hour at 11:05, 11:10, 11:31, and 11:54. Subsequently, a third fragment (340) is received which includes purchase information associated with purchases which occurred at 11:57, 12:06, 12:24, and 12:40.

It is noted that the 11:57 time in the first row (342) of the third fragment (340) falls within the 11 o'clock hour and not the 12 o'clock hour. Time-wise, this row is a better fit with the second fragment (320) as opposed to the third fragment (340). With big data systems, it is not uncommon for information to be delayed and in this example the 11:57 purchase information did not arrive in time to be included in the 11 o'clock hour log from which the second input fragment (340) is generated. For example, although the 11 o'clock hour log may be sent out at a time when it is believed that all of the 11 o'clock purchase information has been received, some information obviously missed the cutoff. As described above, once a log or fragment is generated or output, that log or fragment is immutable or unchangeable. For this reason, instead of sending out an updated second fragment (e.g., with the delayed 11:57 purchase information added), the delayed 11:57 purchase information is included in the next fragment, which in this case is the third fragment (340).

The following figure shows an example of an operation and sub-operations which are generated from that operation.

Figure 4:
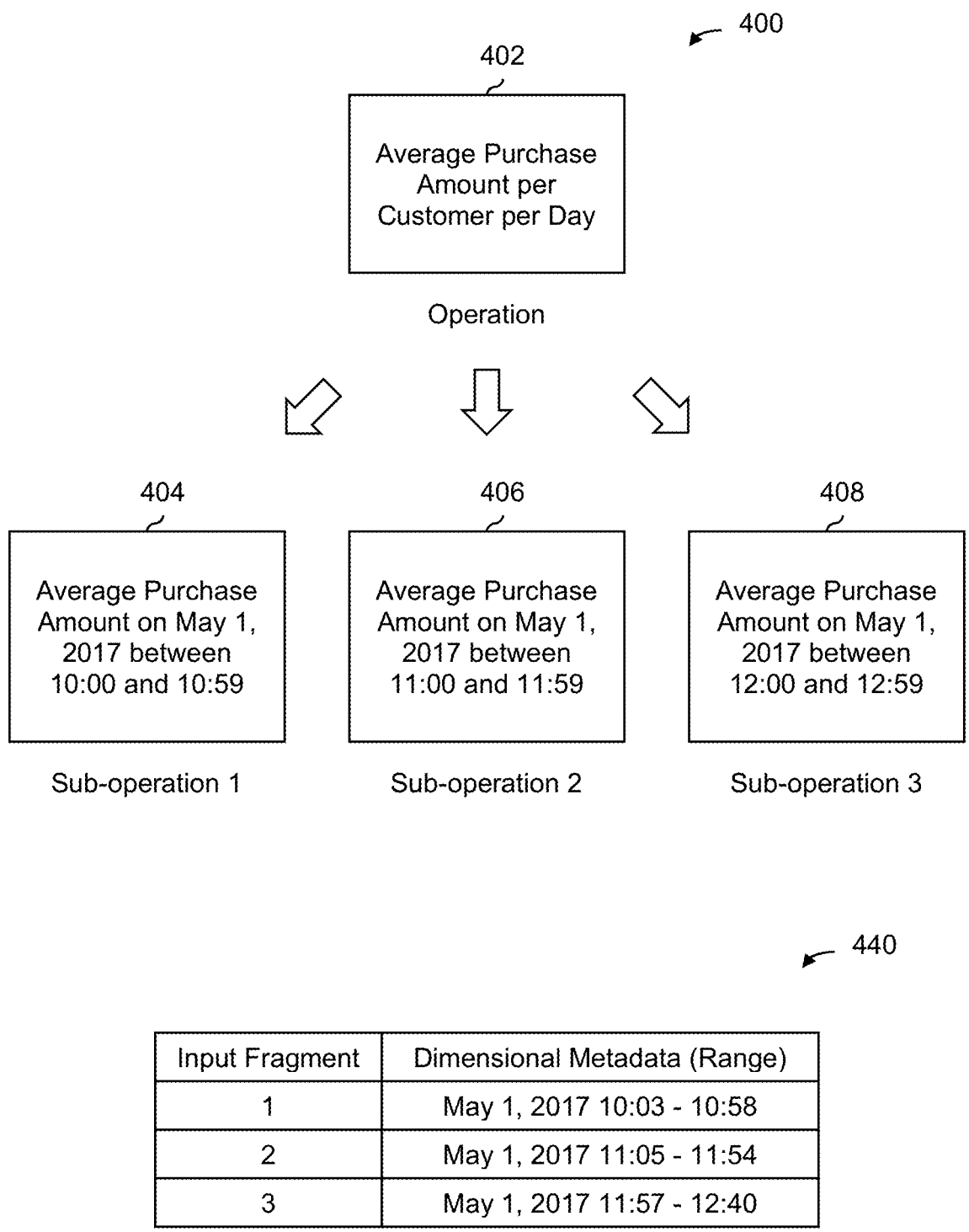
FIG. 4 is a diagram illustrating an embodiment of an operation and sub-operations which are generated from that operation.

FIG. 4 is a diagram illustrating an embodiment of an operation and sub-operations which are generated from that operation. In diagram 400, a more detailed example of the operation (204) and sub-operations (220) from FIG. 2 are described. In this example, the operation (402) is associated with determining an average purchase amount per day (e.g., where multiple values are output, one for each day for which data is input). In some embodiments, there is an interface which permits a user to define an operation and the operation shown here results from a user-defined operation from such an interface.

A dimension is used to divide up the operation (402) into sub-operations (404, 406, and 408). In this example, the dimension is time and the operation is divided up into sub-operations, each of which corresponds to a different 1-hour block. In this example, each sub-operation determines the average purchase amount for a given 1-hour block: between 10:00 and 10:59 on May 1, 2017 for the first sub-operation (404), between 11:00 and 11:59 on May 1, 2017 for the second sub-operation (406), and between 12:00 and 12:59 on May 1, 2017 for the third sub-operation (408). This is one example of step 104 in FIG. 1, where a plurality of sub-operations is generated. Since each sub-operation is only concerned with generating a value for a particular 1-hour block, it is not necessary for a given sub-operation to input fragments which only contain data outside of that 1-hour block. For example, if an input fragment only contains data in the 11 o'clock hour (see, e.g., second input fragment (320) in FIG. 3) then it is not necessary to have a sub-operation which is only concerned with the 10 o'clock hour (see, e.g., first sub-operation 404) input that fragment.

Each sub-operation determines some intermediate result (not shown) for its given 1-hour block and the intermediate results are then combined together, if/as needed. This combined result from all of the intermediate results is the same as if the original operation (402) had been performed on the artifact and/or fragments.

Diagram 420 shows a more detailed example of dimensional metadata 218 in FIG. 2. In this example, the dimensional metadata is the range associated with the dimension (in this example, time) for each input fragment. Using the input fragments shown in FIG. 3, this corresponds (at least in this example) to extracting the minimum and maximum values from each column 308 for each of input fragments 300, 320, and 340. As diagram 420 shows, for the first input fragment, the range is from 10:03 to 10:58 on May 1, 2017; for the second input fragment, the range is from 11:05 to 11:54 on May 1, 2017; for the third input fragment, the range is from 11:57-12:40 on May 1, 2017.

Using the dimensional metadata shown in diagram 440, the appropriate input fragment(s) (e.g., 300, 320, and/or 340 in FIG. 3) is/are input by the appropriate sub-operation(s) (e.g., 404, 406, and/or 408 in diagram 400) and the appropriate sub-operation(s) are run. The following figures shows an example of this over a period of time as the various exemplary input fragments arrive.

Figure 5A:
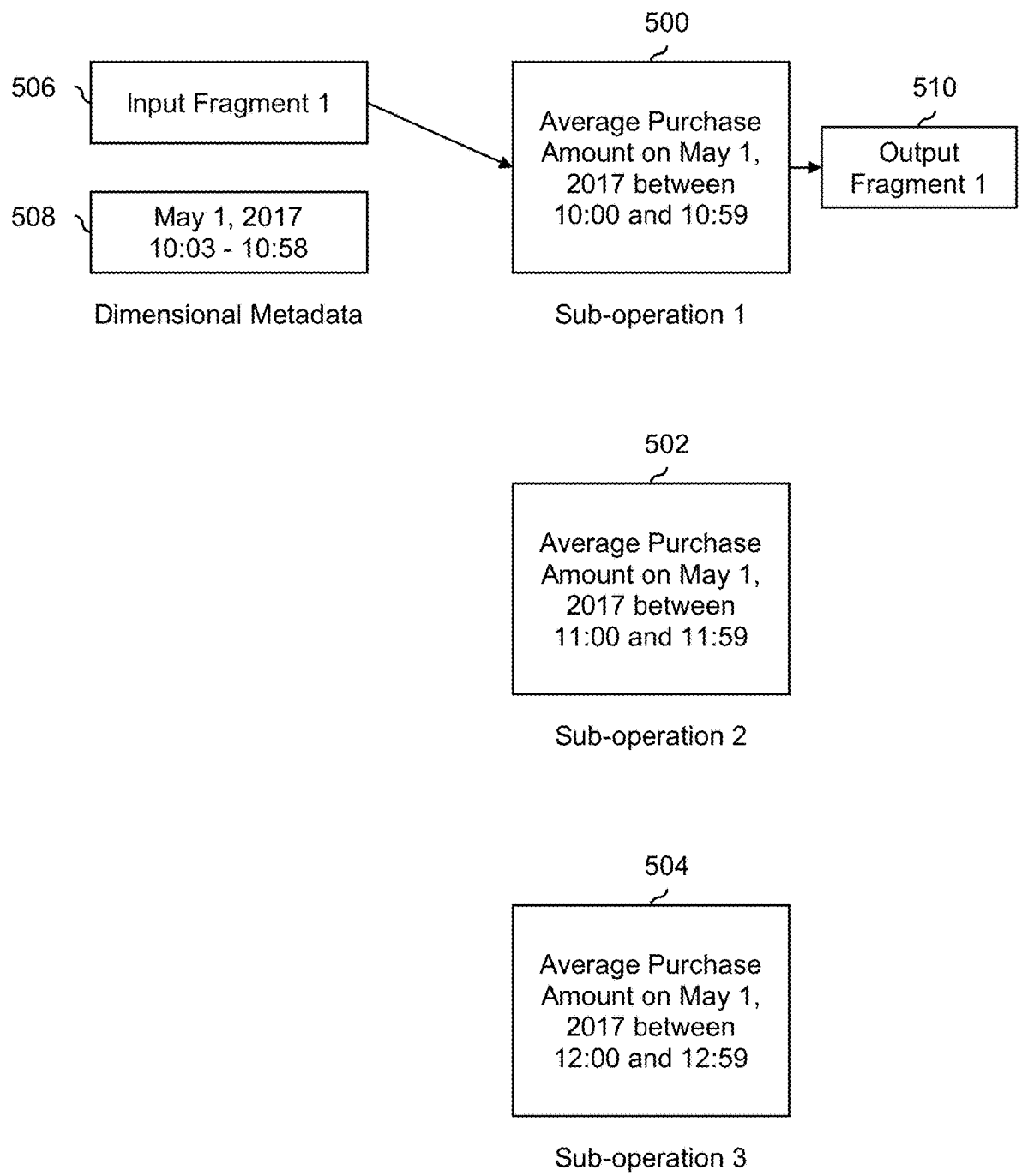
FIG. 5A is a diagram illustrating an embodiment of a first sub-operation which is performed in response to the arrival of a first input fragment.

FIG. 5A is a diagram illustrating an embodiment of a first sub-operation which is performed in response to the arrival of a first input fragment. As before, there are three sub-operations (500, 502, and 504) which are associated with determining the average purchase amount for different 1-hour blocks of time on the day in question. The first input fragment (506) is received and in response, dimensional metadata (508) is generated for the first input fragment. As shown, the metadata includes a range of times from 10:03 to 10:58 on May 1, 2017.

Using the dimensional metadata (508), it is determined which sub-operations should be run on the corresponding first input fragment (506) so that downstream data and the datapath graph's outputs (i.e., nodes) can have up to date information. In this example, the time range in the dimensional metadata (508) falls completely within the range of the first sub-operation (500) and so that sub-operation is performed on the first input fragment. This produces a first output fragment (510).

Figure 5B:
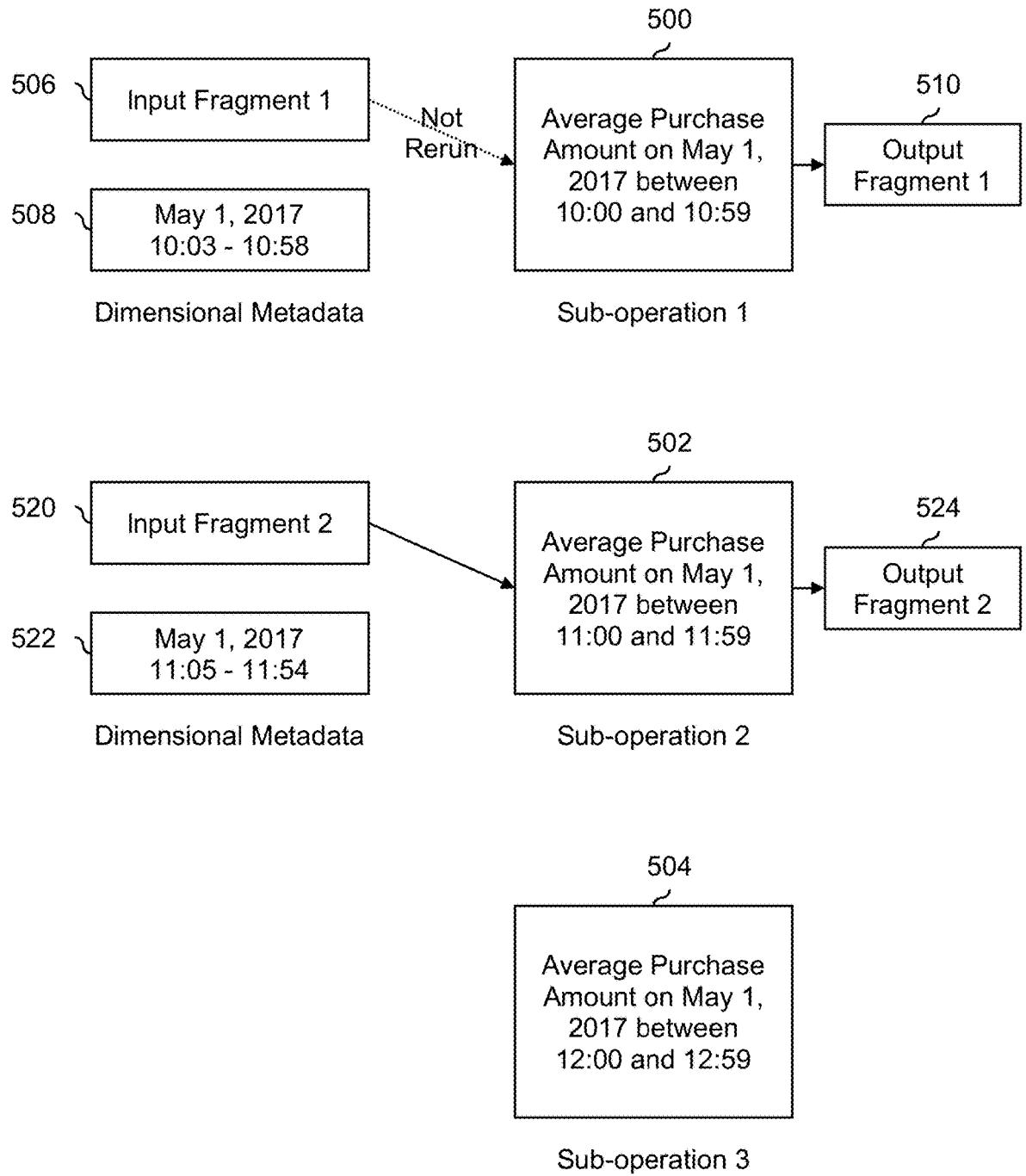
FIG. 5B is a diagram illustrating an embodiment of a second sub-operation which is performed in response to the arrival of a second input fragment.

FIG. 5B is a diagram illustrating an embodiment of a second sub-operation which is performed in response to the arrival of a second input fragment. At this second point in time, the second input fragment (520) has arrived. In response, dimensional metadata (522) is generated for the second input fragment, indicating that the second input fragment has a time range from 11:05 to 11:54 on May 1, 2017.

From this dimensional metadata (522), it is determined that the second sub-operation (502) is the only sub-operation which needs to be run (e.g., since the time range in dimensional metadata (522) completely falls within the 11 o'clock hour for which the second sub-operation is responsible for generating an average purchase amount). This results in a second output fragment (524).

This figure illustrates one of the benefits to the technique described herein. Note that the first sub-operation (500) is not rerun on the first input fragment (506) because the first output fragment (510) would remain the same and so rerunning the first sub-operation would be unnecessary and wasteful. If there were no sub-operations and only the single, monolithic operation existed, then at the point in time shown here, both the first input fragment (506) and the second input fragment (520) would have to be downloaded and processed (e.g., because the single, monolithic operation inputs all available data which exists at any given time). As described above, in this example, the artifacts and fragments are stored remotely (e.g., on cloud storage or other remote storage) and so having to re-download and re-process the first input fragment would require additional time (e.g., to download and process) and (e.g., network or bandwidth) resources. This additional and consumption of time and resource adds up since new logs or input fragments are constantly arriving. In contrast, with sub-operations as shown here, only the second input fragment is downloaded (if needed) and processed in this diagram.

Figure 5C:
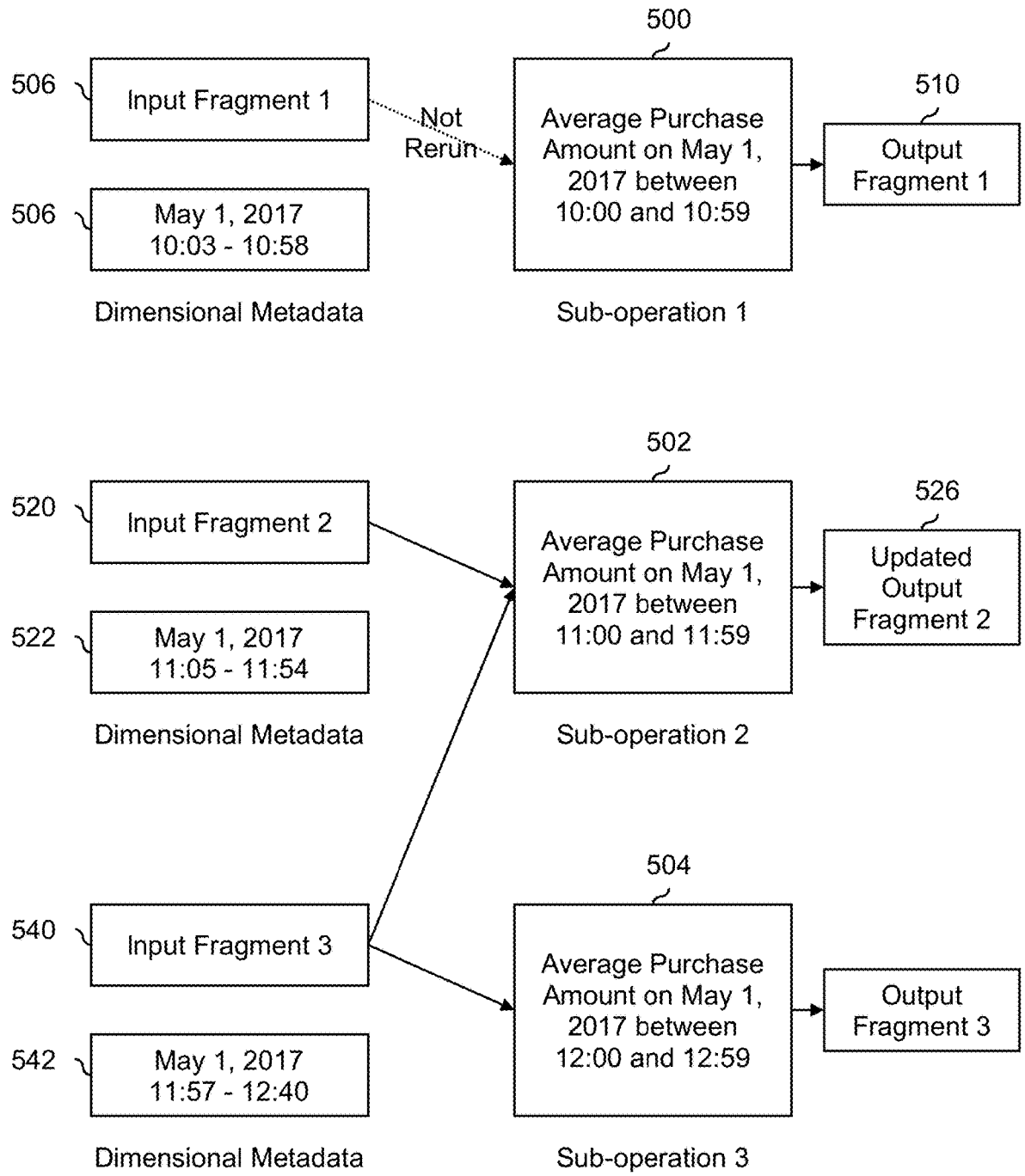
FIG. 5C is a diagram illustrating an embodiment of a second and third sub-operations which are performed in response to the arrival of a third input fragment.

FIG. 5C is a diagram illustrating an embodiment of a second and third sub-operations which are performed in response to the arrival of a third input fragment. In response to the arrival of the third input fragment (540), corresponding dimensional metadata (542) is generated for that fragment. The dimensional metadata (542) indicates that the third input fragment (540) includes information associated with times in the 11 o'clock hour (e.g., 11:57) as well as information associated with times in the 12 o'clock hour (e.g., 12:40). For this reason, both the second sub-operation (502) and the third sub-operation (504) are (re)run.

This second running of the second sub-operation (502) produces an updated second output fragment (526) which includes the 11:57 information from the third input fragment (540) which was not previously accounted for. In this example, the second sub-operation (502) is shown as ingesting both the second input fragment (520) and the third input fragment (540) for properness and/or completeness. Some (but not all) processes require access to both input fragments and for this reason the diagram is shown with both the second input fragment (520) and the third input fragment (540) being input. For example, suppose the sub-operation outputs a Boolean (e.g., True or False) value depending upon whether some number of events have occurred. In order to properly generate the Boolean, the sub-operation needs access to both the second input fragment and third input fragment. It cannot, for example, generate an accurate result from only the 11:57 information in the third input fragment (540). Even if the second sub-operation had access to the original output value (e.g., True or False) as well as the newly-arrived third input fragment, it would not be able to generate an accurate output.

Naturally, if a specific sub-operation is able to process the second input fragment and third input fragment separately and generate a proper result (e.g., by combining the original 2a output fragment from the second input fragment and a newer 2b output fragment from the third input fragment), then the datapath graph can be configured to not have the second sub-operation re-process the second input fragment at the point in time shown here. For example, there would be two output fragments next to the second sub-operation (502): output fragment 2a (which comes from the second input fragment (520)) and output fragment 2b (which comes from the third input fragment (540)).

The following figure describes some of this more formally and generally in a flowchart.

Figure 6:
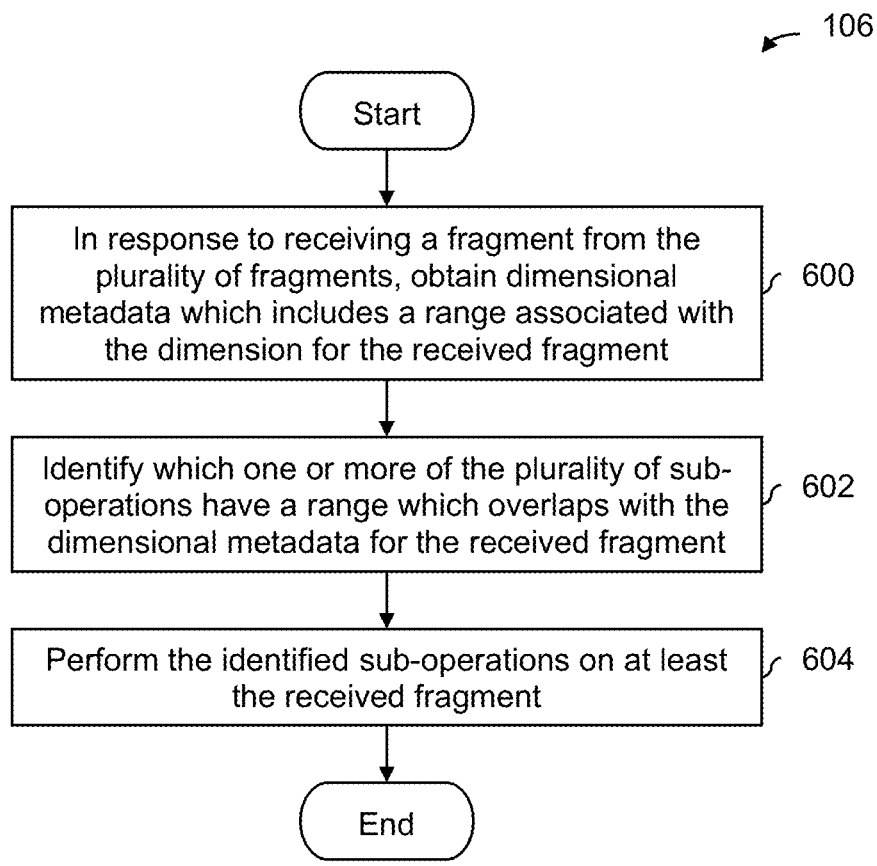
FIG. 6 is a flowchart illustrating an embodiment of a process to perform a plurality of sub-operations on a plurality of fragments, including by identifying which sub-operations have a subset of values which overlaps with the dimensional metadata.

FIG. 6 is a flowchart illustrating an embodiment of a process to perform a plurality of sub-operations on a plurality of fragments, including by identifying which sub-operations have a subset of values which overlaps with the dimensional metadata. In some embodiments, this process is used at step 106 in FIG. 1. The process may be repeated each time a new input fragment is received at a particular part of the datapath graph.

At 600, in response to receiving a fragment from the plurality of fragments, dimensional metadata which includes a range associated with the dimension for the received fragment is obtained. In some embodiments, the dimensional metadata is obtained by generated or otherwise calculated it. For example, in FIG. 5A, in response to receiving the first input fragment (506), dimensional metadata 508 is generated. In the example of FIG. 5B, in response to receiving the second input fragment (520), dimensional metadata 522 is generate. In the example of in FIG. 5C, in response to receiving the third input fragment (540), dimensional metadata 542 is generated. In some other embodiments, the dimensional metadata is obtained by receiving it from some source (e.g., some other node or operation in the system). For example, it could be provided by an upstream or downstream source which uses a cryptographic hash such as ETag in Google Cloud Storage or Amazon Simple Storage Service (S3)).

At 602, which one or more of the plurality of sub-operations have a range which overlaps with the dimensional metadata for the received fragment is/are identified. For example, in FIG. 5A, the first sub-operation (500) is identified. In the example of FIG. 5B, the second sub-operation (502) is identified. In the example of FIG. 5C, both the second sub-operation (502) and the third sub-operation (504) are identified.

At 604, the identified sub-operations are performed on at least the received fragment. It is noted that the other sub-operations (e.g., which are not identified at step 602) are not (re)run. For example, in FIGS. 5B and 5C, the first sub-operation (500) is not rerun. As described above, some other input fragments (e.g., which were received previously) may be ingested or otherwise input by one of the identified sub-operations being run at step 604. In some embodiments, additional fragments (e.g., beyond the fragment which was just received) are operated on by the identified sub-operations at this step. For example, in FIG. 5C, although the second input fragment (520) was already received and processed, it is input and processed again by the second sub-operation (502).

As described above, in some embodiments, a node determines for itself what column to use as its dimension (e.g., instead of having it specified via a user interface, or having the dimension be set by some upstream node). The following figures describe some examples of this.

Figure 7:
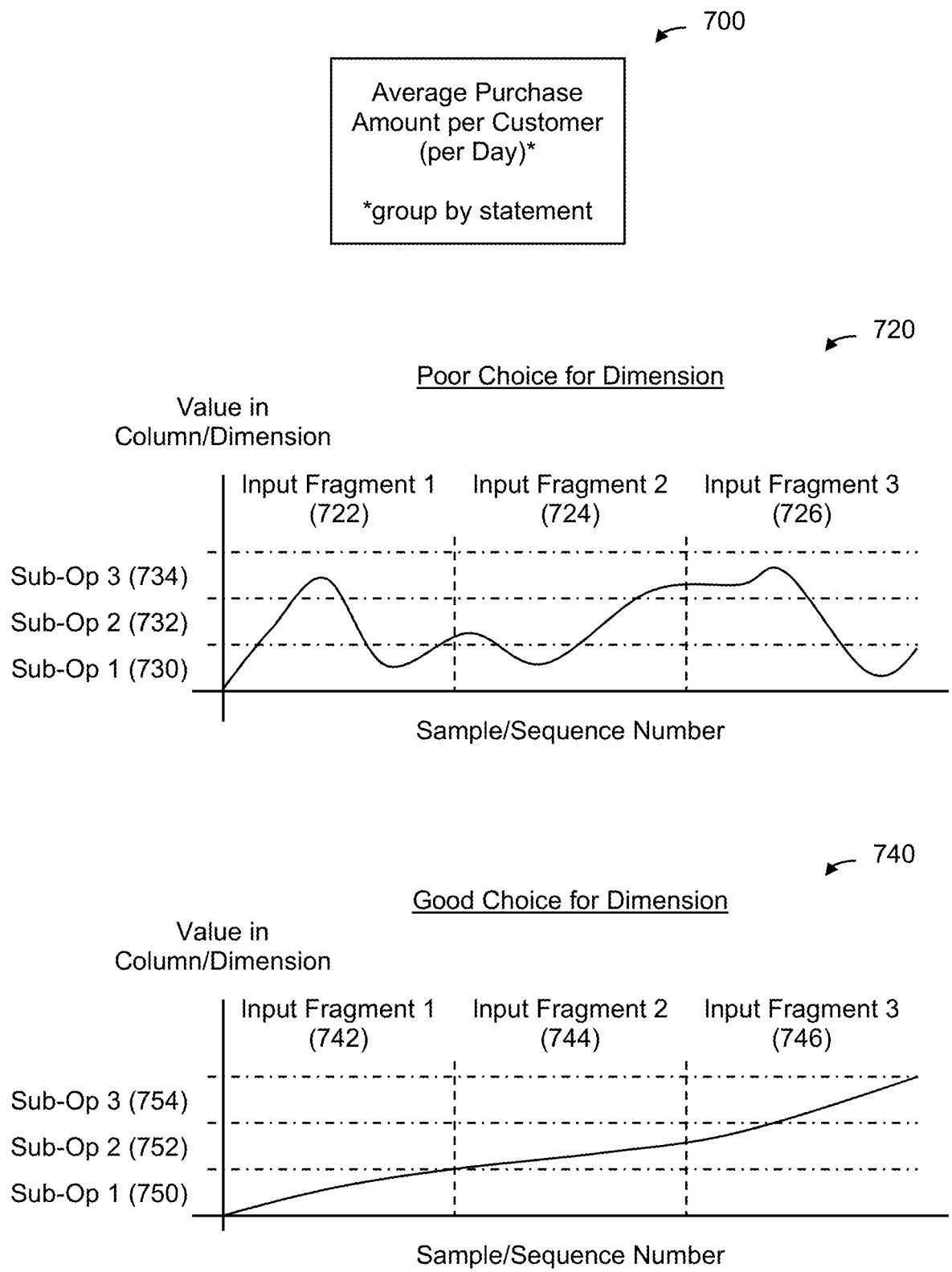
FIG. 7 is a diagram illustrating an embodiment of a dimension which is selected based on a group by statement, as well as embodiments of good and bad dimensions.

FIG. 7 is a diagram illustrating an embodiment of a dimension which is selected based on a group by statement, as well as embodiments of good and bad dimensions. As described above, having some process automatically determine the dimension would eliminate the need for a user to specify the dimension and may result in a better dimension which in turn results in better performance.

Diagram 700 shows an example of a user defined operation (e.g., a SQL statement or operation) which is used to determine the dimension. In this example, the operation is to determine the average purchase amount per day. In previous figures, this operation may be the operation received at step 100 in FIG. 1 and/or operation 204 in FIG. 2, etc.

The "per day" part of the operation is associated with or part of a group by statement. For example, the operation may be an aggregate operation that is performed on a table with rows and columns (e.g., fragments) and the group by statement (in this example, per day) refers to a particular column. Using FIG. 3 as an example, the group by statement in that example may refer to the time column (308). In some embodiments, a dimension is (e.g., automatically) selected or determined by inspecting the operation for a group by statement (e.g., looking for specific syntax, fields, tags, markups, etc. which identify a group by statement) and the specified column in the fragment(s) is selected as the dimension. For example, in SQL, the group by syntax is "GROUP BY <column name(s)>."

A group by statement in many cases is a strong indicator of a good choice for a dimension and therefore in some embodiments is the first thing a dimension selection process checks for and (if available) uses to set the dimension. In some embodiments, if there is no group by statement, then columns (e.g., in an input fragment) are analyzed for columns which would make a good dimension and a good or best dimension is selected.

Diagram 720 and diagram 740 respectively show examples of what is meant by a bad choice and a good choice for a dimension. In both of the diagrams, the x-axis corresponds to the sample or sequence number (e.g., the order in which information is received). For example, the first input fragment (722/742) corresponds to the lowest range of sample or sequence numbers, the second input fragment (724/744) corresponds to the middle range of sample or sequence numbers, and the third input fragment (726/746) corresponds to the highest range of sample or sequence numbers, where the input fragments arrive in that order. See, for example, input fragments 300, 320, and 340 in FIG. 3.

The y-axis in both diagrams shows the value in the given column or dimension (e.g., the value for that data point in the column being used as the dimension). As before, there are three sub-operations, each of which corresponds to a different (e.g., non-overlapping) range associated with the column/dimension. The first sub-operation (730/750) corresponds to the lowest range, the second sub-operation (732/752) corresponds to the middle range, and the third sub-operation (734/754) correspond to the highest range. See, for example, sub-operations 404, 406, and 408 in FIG. 4.

In diagram 720, the exemplary column/dimension is not (substantially) monotonically changing. for example because the signal increases and decreases at various regions (e.g., going from left to right in the graph). When the first input fragment (722) is received, all of sub-operations (730, 732, and 734) will need to be run. Subsequently, when the second input fragment (724) is received, all of sub-operations (730, 732, and 734) will need to be rerun and (more importantly) the first input fragment (722) will need to be downloaded and reprocessed by all of the sub-operations. As described above, some sub-operations require all available data to be input in order to generate an accurate or proper output. Similarly, when the third input fragment (726) is received, both the first input fragment (722) and second input fragment (724) need to be (re)downloaded and reprocessed by all of sub-operations (730, 732, and 734). This both consumes a large amount of network resources (e.g., to repeated download all previous input fragments) and a large amount of processing resources (e.g., rerun all of the sub-operations with the arrival of each input fragment).

In general, a dimension with values which can be partitioned into sets with low frequency of overlap is desirable. "Monotonically changing" is one example of this but is not the only characteristic with this property. In another example, geographic information such as country in some cases has low frequency of overlap. For example, suppose that log files are generated by servers which serve different geographic regions. As a result, the information contained in the logs will tend to have low overlap. Data from logs generated by the European server will have little overlap (e.g., at least in terms of a "country" field or column) compared to logs generated by another server which services North America.

Examples of columns which are a poor choice for dimension are columns with oscillating data because the values constantly go back and forth between some minimum and maximum. Columns with random data also tend to make poor dimensions. Returning briefly to FIG. 3, the customer information column (302), purchase information column (304) information, and store information column (306) are some examples of random columns that would be poor choices for a dimension.

In contrast, diagram 740, which shows a column with monotonically changing (in this example, monotonically increasing) data makes a good choice for a dimension. When the first input fragment (742) arrives, only the first sub-operation (750) needs to be performed. Similarly, when the second input fragment (744) arrives, only the second sub-operation (752) needs to be performed and the first input fragment (742) does not need to be downloaded from some remote storage. Finally, when the third input fragment (746) arrives, both the second sub-operation (752) and the third sub-operation (754) are performed and the second input fragment (744) is downloaded and reprocessed. Therefore, with the example shown in diagram 740, fewer network resources and fewer processing resources would be consumed compared to the example shown in diagram 720. In other words, a column with monotonically changing data may be a better choice for a dimension compared to a column with non-monotonically changing data.

It is noted that even though the second input fragment (744) is downloaded and re-processed (e.g., by the second sub-operation when the second input fragment (744) arrives, only the second sub-operation (752) needs to be performed and the first input fragment (742) does not need to be downloaded from some remote storage, the number of such affected fragments and/or the frequency of this occurrence will tend to be lower with a monotonically changing function (one example of which is shown in diagram 740) versus a non-monotonically changing function (one example of which is shown in diagram 720).

To put it another way, it is undesirable to have the amount of data that needs to be processed grow with time. For example, if partitioning was done by a column that was random, all of the historical data (e.g., which has previously been processed) would need to be re-processed each time new data came in. In the second year, 1+ year of data would be processed. The third year, 2+ years of data would be processed and so on. If, however, the data has small overlaps that don't change with time, the amount of reprocessed data doesn't grow (e.g., as quickly or as consistently) with time.

In addition to time, another example of a good dimension is position information (e.g., latitude and longitude) where the path follows a substantially direct path between point A and point B. For example, a trans-Pacific ship or airplane traveling from Asia to the West Coast of the United States will tend to have a monotonically changing longitude as the ship or airplane travels across the Pacific Ocean. Or, if the information is associated with data packets or network packets, such packets often have sequence numbers which monotonically increase and a column with such sequence numbers may make a good dimension.

In another, non-time example, data from different data centers that serve different regions is collected. If the data were partitioned by country (e.g., there is a "group by country" command or operation) it would probably not be necessary to reprocess any Japan-related data when a data center in London issued new logs.

In some embodiments, a group by statement includes or refers to multiple columns. For example, suppose that the operation shown in diagram 700 instead were for the average purchase amount per store per day. This would generate an average purchase amount for store X on day Y. In that case, the group by statement would refer to both a store information column (e.g., column 306 in FIG. 3, which identifies the store where a purchase occurred) as well as a time column (e.g., 308 in FIG. 3, which identifies when a purchase occurred). In some embodiments, to select between two or more columns in a group by statement, the candidate columns are evaluated to determine which contains data that more closely resembles a partitionable (e.g., a monotonically changing function such as in diagram 740).

Alternatively, there may be no group by statement (e.g., because the operation does not call for it) and all columns may be evaluated to identify the column with data that more closely resembles a monotonically changing function. For example, there may be a selection operation (e.g., of some subset meeting some criteria) in order to identify a candidate for portioning (e.g., what is a good column for portioning). If that column has "good properties" (e.g., low frequency of overlap) then it may be used, otherwise it does not necessarily have to be used.

The following figures describe more formally and generally in flowcharts the various examples described above regarding how a dimension may be obtained at step 102 in FIG. 1. It is noted that some parts (e.g., nodes) of a datapath graph may use one technique to obtain their dimension (e.g., get it from a user interface or get it from a group by statement) while others obtain their dimension through some other technique (e.g., they use the same dimension as an upstream node).

Figure 8:
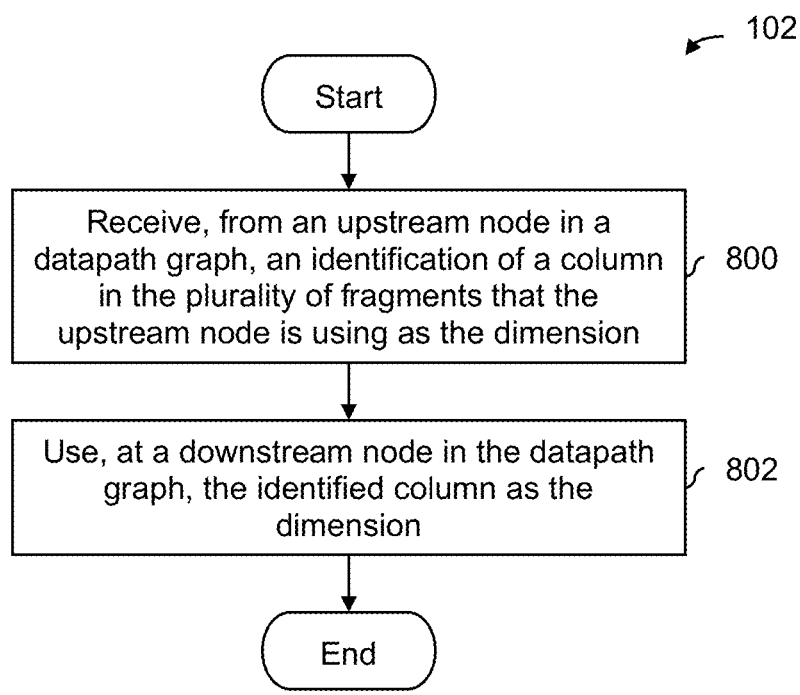
FIG. 8 is a flowchart illustrating an embodiment of a process to receive a dimension from an upstream node.

FIG. 8 is a flowchart illustrating an embodiment of a process to receive a dimension from an upstream node. In some embodiments, the process is used at step 102 in FIG. 2 to obtain a dimension.

At 800, an identification is received from an upstream node in a datapath graph of a column in the plurality of fragments is that the upstream node is using as the dimension. For example, in FIG. 2, there may be many nodes between the source (200) and the sink (202) and the identification (as an example) is received at operation node 208 from an upstream node (not shown) between source 200 and operation node 208. In FIG. 3, the upstream node may identify time column 308 as the column the upstream node is using as the dimension.

At 802, at a downstream node in the datapath graph, the identified column is used as the dimension. To continue the example from above, operation node 208 in FIG. 2 would use time column 308 in FIG. 3 as its dimension.

Figure 9:
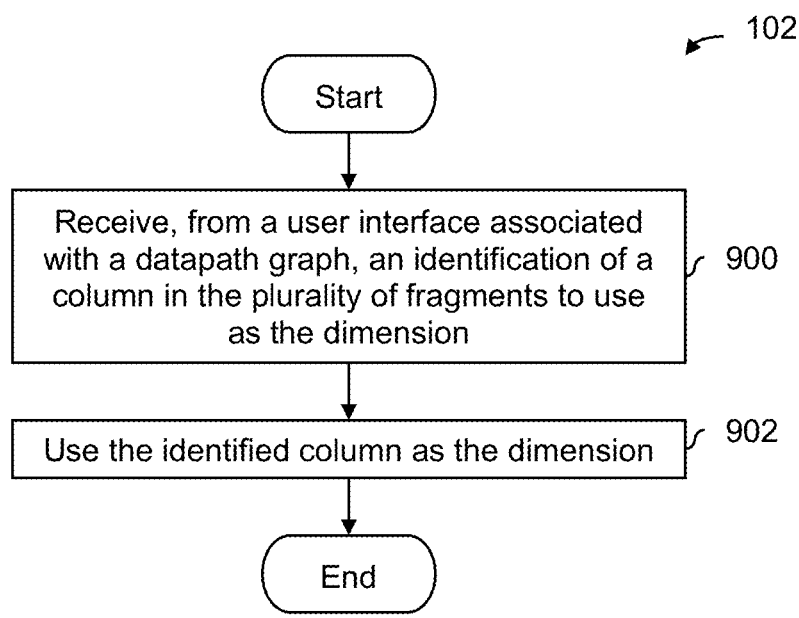
FIG. 9 is flowchart illustrating an embodiment of a process to receive a dimension from user interface associated with a datapath graph.

FIG. 9 is flowchart illustrating an embodiment of a process to receive a dimension from user interface associated with a datapath graph. In some embodiments, the process is used at step 102 in FIG. 2 to obtain a dimension.

At 900, an identification of a column in the plurality of fragments to use as the dimension is received from a user interface associated with a datapath graph. For example, this user interface may also enable a user to specify operations which generate reports about and/or analyze the (source) big data.

At 902, the identified column is used as the dimension.

Figure 10:
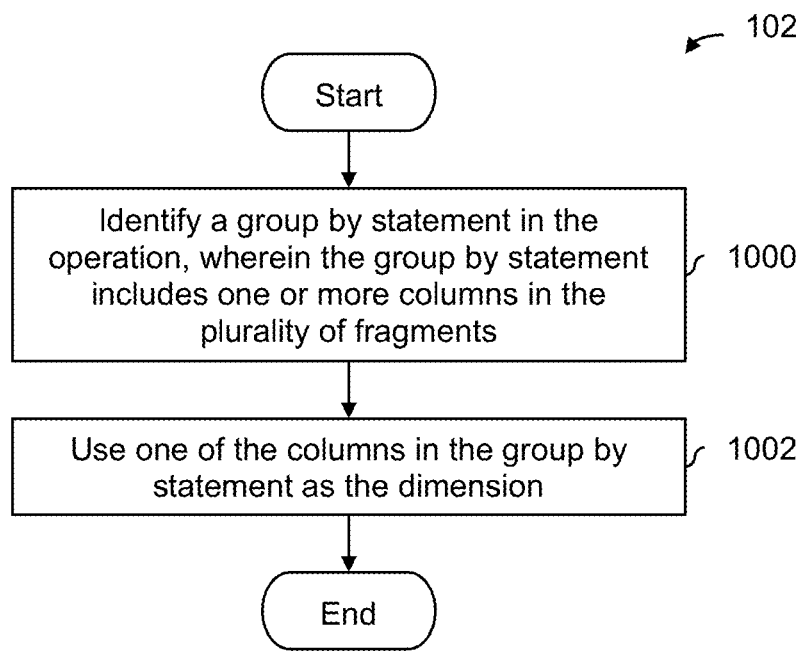
FIG. 10 is a flowchart illustrating an embodiment of a process to determine a dimension using a group by statement.

FIG. 10 is a flowchart illustrating an embodiment of a process to determine a dimension using a group by statement. In some embodiments, the process is used at step 102 in FIG. 2 to obtain a dimension.

At 1000, a group by statement in the operation is identified, wherein the group by statement includes one or more columns in the plurality of fragments. For example, in FIG. 1, the operation which is received at step 100 is the operation from which the group by statement is identified. Specific search words, phrases, or tags which identify the group by statement may be searched for within the operation (e.g., "GROUP BY").

At 1002, one of the columns in the group by statement is used as the dimension. For example, if there is only one column included in the group by statement, then that column is selected or otherwise used as the dimension. If there are two or more columns included in the group by statement, then some other technique (e.g., FIG. 11 which analyzes the columns) may be used as a tie breaker and select from the columns identified in the group by statement.

Figure 11:
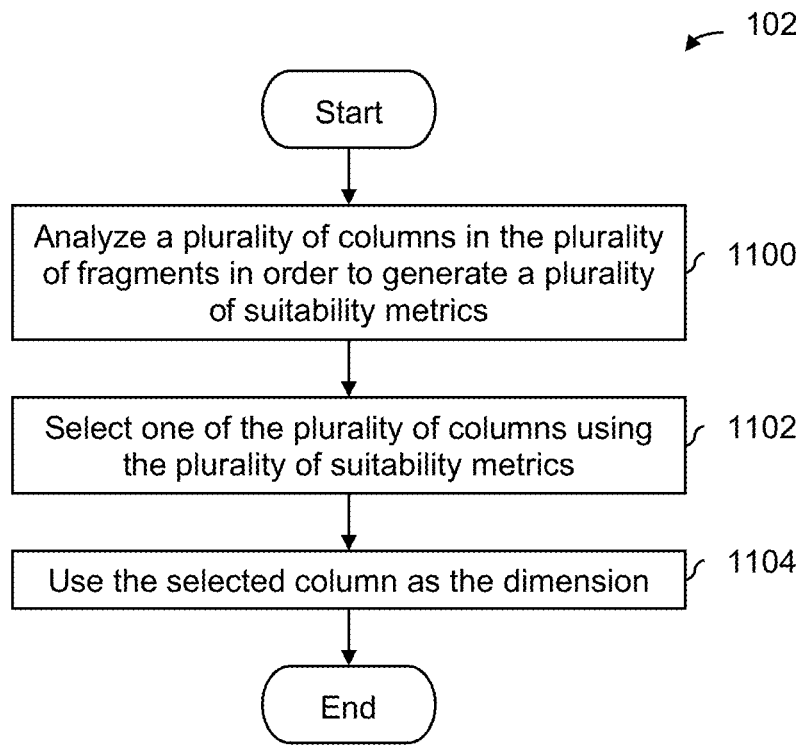
FIG. 11 is a flowchart illustrating an embodiment of a process to determine a dimension by analyzing columns.

FIG. 11 is a flowchart illustrating an embodiment of a process to determine a dimension by analyzing columns. In some embodiments, the process is used at step 102 in FIG. 2 to obtain a dimension.

At 1100, a plurality of columns in the plurality of fragments is analyzed in order to generate a plurality of suitability metrics. For example, in FIG. 8, the suitability metric (e.g., expressed as some quantity or value) would be associated with the degree or amount to which a particular column contains monotonically changing data. For example, there were 100 fragments and each range touched three fragments, that would be acceptable. If there were 100 fragments and each had substantially the same minimums and maximums, the resulting performance would be unacceptable or otherwise undesirable. In that example, a suitability metric would be generated for the column of data shown in diagram 820 and another would be generated for the column of data in diagram 840 and the metric.

In some embodiments, a group by statement includes two or more columns and this process is used to select the best column as the dimension. In such embodiments, the plurality of columns which are analyzed at step 1100 are limited to those which are included in the group by statement.

At 1102, one of the plurality of columns is selected using the plurality of suitability metrics. For example, the column with the highest or lowest suitability metric would be selected, depending upon whichever extreme corresponded to the best column to be used as the dimension.

At 1104, the selected column is used as the dimension. For example, in FIG. 8, the column associated with diagram 840 would be used as the metric.

Figure 12:
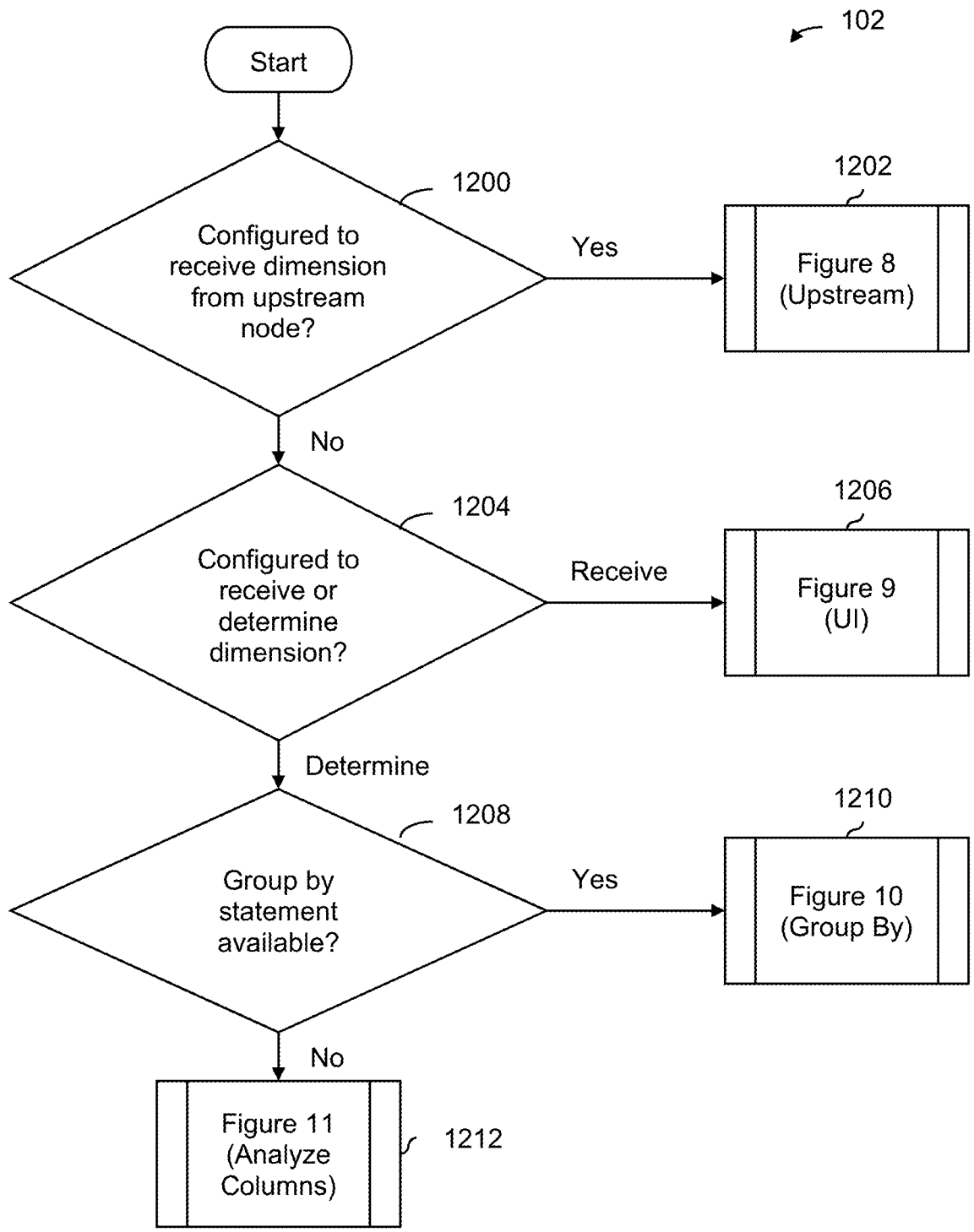
FIG. 12 is a flowchart illustrating an embodiment of a process to obtain a dimension where multiple techniques are available.

FIG. 12 is a flowchart illustrating an embodiment of a process to obtain a dimension where multiple techniques are available. In some embodiments, the process is used at step 102 in FIG. 1 to obtain a dimension. For brevity, a single combination which includes all of FIGS. 8-11 is shown here and all possible combinations are not exhaustively described. Naturally, in some other embodiments, some other combination and/or ordering of techniques may be used.

At 1200, it is determined whether it (e.g., this node) is configured to receive a dimension from an upstream node. For example, there may be many nodes in the datapath graph and each of the nodes may perform the process shown here independently. In one example, nodes which are not in the first layer or level of nodes (e.g., they do not immediately follow source 200 in FIG. 2) must use the same dimension as its upstream node(s). In such embodiments, nodes which are in the first level would decide "No" and all other nodes (e.g., in the middle of the datapath graph or toward the sinks) would decide "Yes" at this step. This may be desirable because it forces the datapath graph to be consistent and reduces duplicate decision making and/or processing.

If it is determined at step 1200 that it (e.g., this node) is configured to receive a dimension from an upstream node, then the process of FIG. 8 is performed at 1202 where a dimension is received from an upstream node.

Otherwise, it is determined at step 1204 if it (e.g., this node) is configured to receive or determine a dimension. For example, in some embodiments, the user interface does not expose controls via which a dimension can be specified. That is, in some cases, a user interface does not support a user-specified dimension. Alternatively, in some other embodiments, processes to evaluate operations for group by statements and/or analyze columns as to whether they would make a dimension may not be implemented yet and therefore the system is configured to use the dimension specified via a user interface. In some embodiments, a group by statement is the "gold standard" and the decision at step 1204 includes determining whether there is a group by statement in an operation.

If it is determined at step 1204 that it (e.g., this node) is configured to receive a dimension, then the process of FIG. 9 is performed at 1206 where a dimension is received from a user interface associated with the datapath graph.

Otherwise, it is determined at 1208 if a group by statement is available. For example, group by statements are only relevant to or included in some types of operations (e.g., aggregate operations) and other types of operations do not include a group by statement.

If it is determined at 1208 that a group by statement is available, then the process of FIG. 10 is performed at 1210 where a dimension is determined using a group by statement. Otherwise, the process of FIG. 11 is performed at 1212 where a dimension is determined by analyzing columns.

In some embodiments, the decision at step 1200 and/or step 1204 includes evaluating or otherwise assessing whether the received dimension is appropriate (e.g., based on the particular operation for that node). In other words, the received dimension may be a suggested or optional dimension and if it is not a good fit for that operation, it is not used and a dimension is determined locally. For example, a received partition may be related to time and the operation may relate to grouping by user and therefore the received partition is not a good fit for that operation.

In some cases, to address the above example, a node and a corresponding operation is added which repartitions or otherwise transforms the data to have better partitioning so that the data can more efficiently be processed by a downstream operation. For example, in the above scenario, a new node and new operation could be inserted which would change the partitioning from time-based partitioning to user-based partitioning. Considerations or factors in deciding whether to insert a new node and new operation include the amount of data being ingested (e.g., kilobytes versus terabytes in the cloud storage), the frequency of new data arriving (e.g. if infrequent arrival, the inefficiency may acceptable), etc.

In some embodiments, the data (e.g., the artifacts and fragments) is stored remotely on a long term basis and only the metadata (e.g., the dimensional metadata) is stored locally on the datapath graph on a long term basis. The following figures shows some examples of this.

Figure 13:
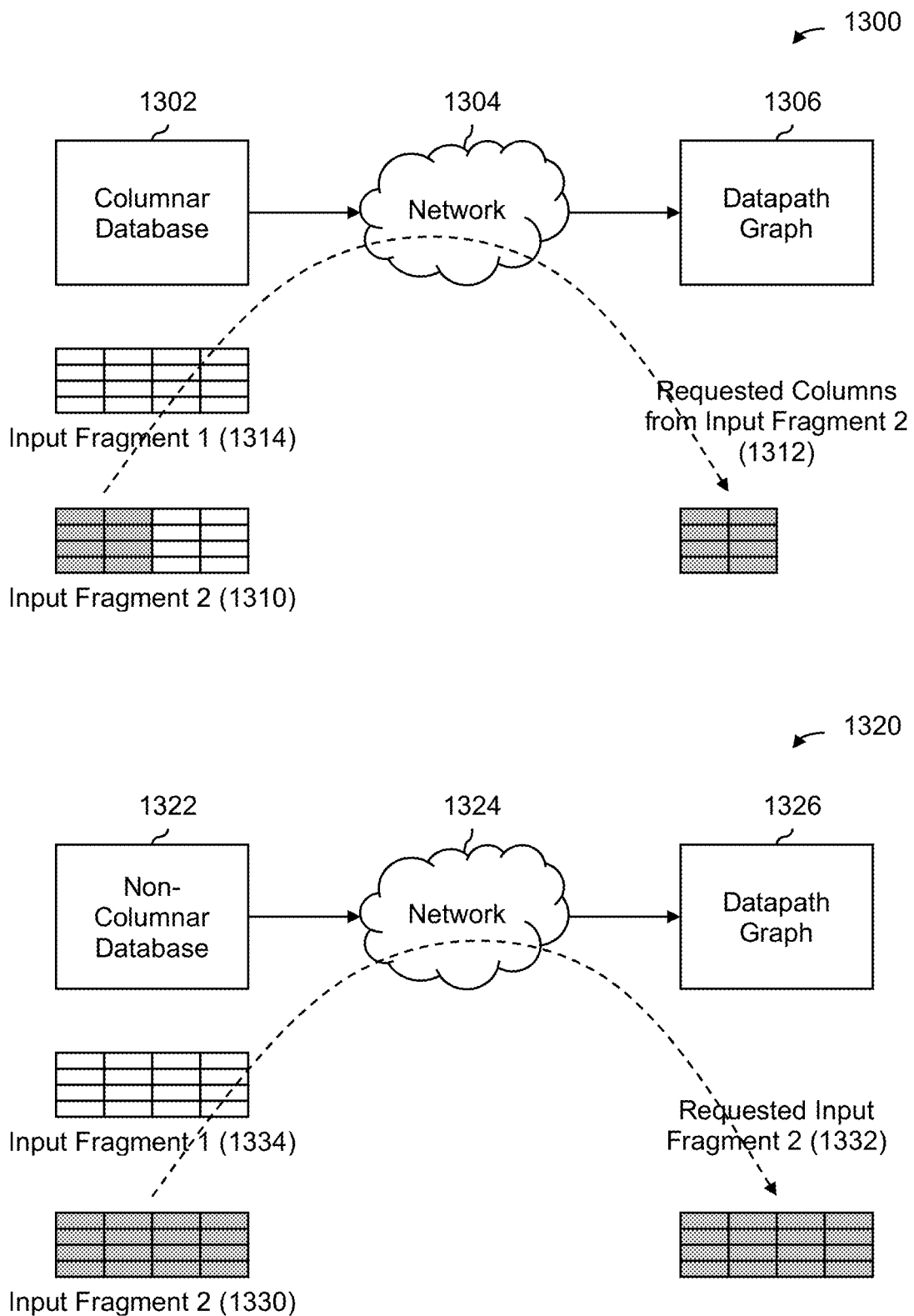
FIG. 13 is a diagram illustrating two embodiments of a remote storage system which store the artifacts and fragments.

FIG. 13 is a diagram illustrating two embodiments of a remote storage system which store the artifacts and fragments. In both examples, the state corresponding to FIG. 5B is shown where a second input fragment has just arrived and a second sub-operation (not shown) is performed in response.

In diagram 1300, the remote storage device is a columnar database (1302). In this example, datapath graph 1306 only needs some columns from the second input fragment (1310) and requests only those columns (shaded). Those requested columns (shaded) in the second input fragment (1310) are sent from the columnar database (1302) to the datapath graph (1306) via the network (1304). Once on the datapath graph, the requested columns (1312) are processed by the appropriate sub-operation(s) (not shown) and deleted when no longer needed. In some embodiments, the columnar remote storage includes or comprises cloud storage. For example, Google's BigQuery is a cloud storage service which uses columnar storage.

Diagram 1320 shows an example where the remote storage device is a non-columnar database (1322), such as a SQL database. In some embodiments, the non-columnar database (1322) is associated with or includes cloud storage. As before, the second input fragment (1330) is sent from the non-columnar database (1322) to the datapath graph (1326) via the network (1324). The requested input fragment (1332)

is stored locally on the datapath graph (1326) where it is processed by the appropriate sub-operation(s) and deleted when no longer needed. In this example, all of the columns in the requested fragment (1330/1332) are exchanged over the network, not just the ones of interested to the sub-operation. As a result, although there is some bandwidth saved (e.g., because the first input fragment is not exchanged over the network) it is not as efficient as when a columnar database is used. For this reason (and assuming all other design considerations are equal), it may be desirable to use a columnar database over a non-columnar database.

Figure 14:
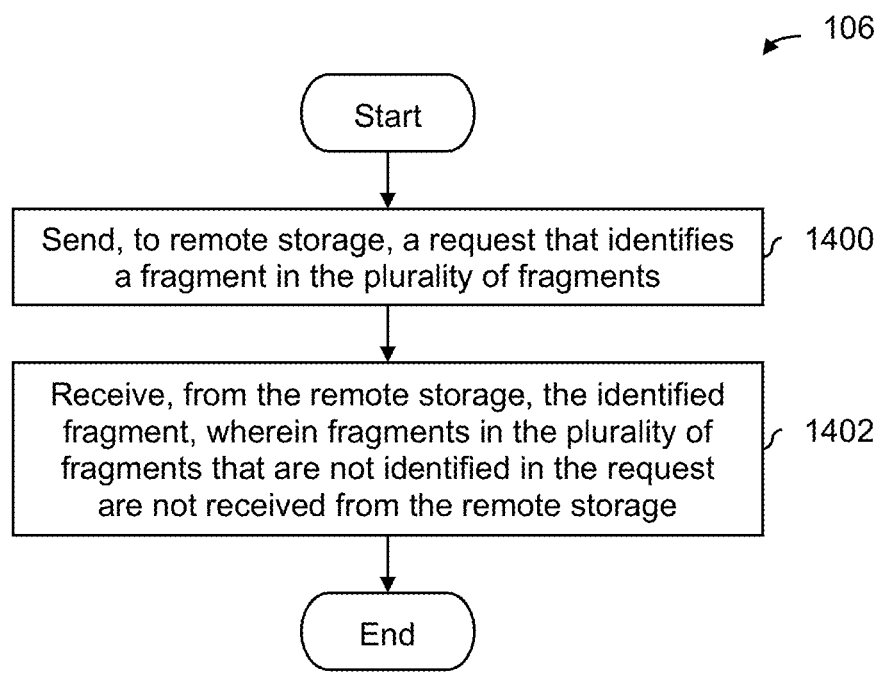
FIG. 14 is a flowchart illustrating an embodiment of a process to perform a plurality of sub-operations on a plurality of fragments, including by receiving at least one fragment from remote storage.

FIG. 14 is a flowchart illustrating an embodiment of a process to perform a plurality of sub-operations on a plurality of fragments, including by receiving at least one fragment from remote storage. In some embodiments, the process is used at step 106 in FIG. 1.

At 1400, a request that identifies a fragment in the plurality of fragments is sent to remote storage. For example, in diagram 1300 in FIG. 13, datapath graph 1306 sends a request to columnar database 1302 which identifies the second input fragment (1310). Similarly, in diagram 1320, datapath graph 1326 sends a request to non-columnar database 1322 which identifies the second input fragment (1330).

At 1402, the identified fragment is received from the remote storage, wherein fragments in the plurality of fragments that are not identified in the request are not received from the remote storage. For example, in diagram 1300 in FIG. 13, the first input fragment (1314) was not requested and is therefore not sent to the datapath graph (1306). Similarly, in diagram 1320, the first input fragment (1334) was not requested and is therefore not sent to the datapath graph (1326).

Figure 15:
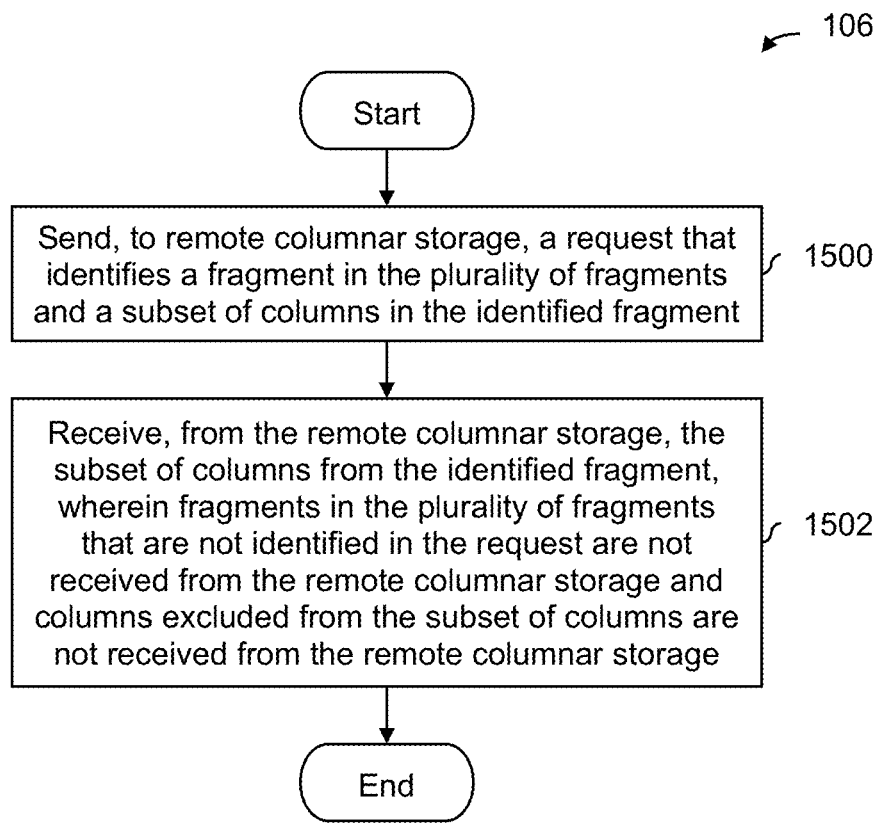
FIG. 15 is a flowchart illustrating an embodiment of a process to perform a plurality of sub-operations on a plurality of fragments, including by receiving at least one fragment from remote columnar storage.

FIG. 15 is a flowchart illustrating an embodiment of a process to perform a plurality of sub-operations on a plurality of fragments, including by receiving at least one fragment from remote columnar storage. In some embodiments, the process is used at step 106 in FIG. 1.

At 1500, a request that identifies a fragment in the plurality of fragments and a subset of columns in the identified fragment is sent to remote columnar storage. For example, in diagram 1300 in FIG. 13, datapath graph 1306 sends a request to columnar database 1302 which identifies the second input fragment (1310), as well as specific columns in that fragment (shaded). In one example, the remote columnar storage is Google's BigQuery.

At 1502, the subset of columns from the identified fragment is received from the remote columnar storage, wherein fragments in the plurality of fragments that are not identified in the request are not received from the remote columnar storage and columns excluded from the subset of columns are not received from the remote columnar storage. For example, in diagram 1300 in FIG. 13, the first input fragment (1314) is not received at the datapath graph (1306), nor does the datapath graph receive the unrequested columns in the second input fragment (e.g., not shaded).

In some embodiments, the logs from the source are stored as-is on remote storage and the fragments are obtained or retrieved from the logs as/when needed using a cover. The following figures describe some examples of this.

Figure 16:
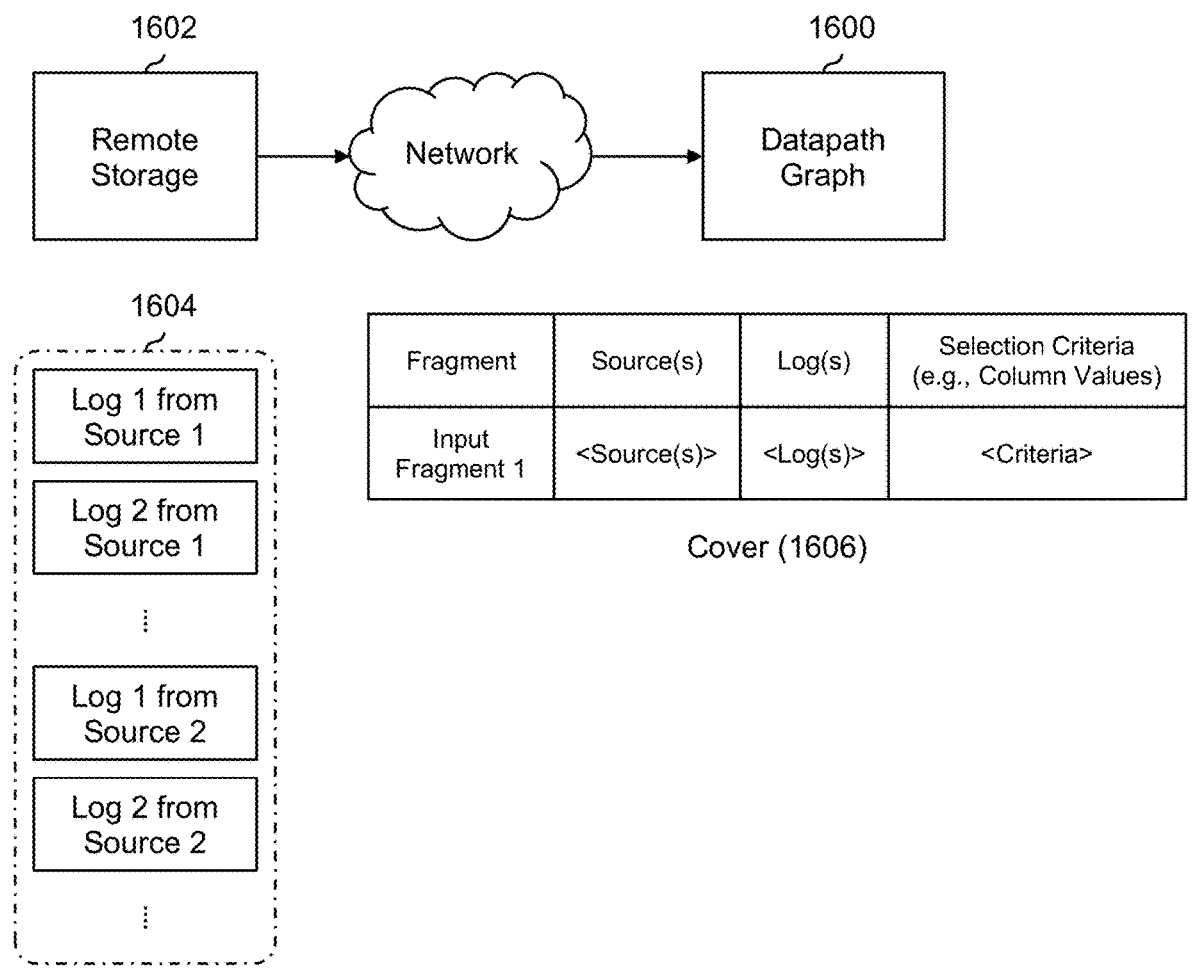
FIG. 16 is a diagram illustrating an embodiment of a cover.

FIG. 16 is a diagram illustrating an embodiment of a cover. In the example shown, a datapath graph (1600) and remote storage (1602) are connected via a network. Logs from sources (1604) are stored in the original form with their original information on the remote storage. In this example, the datapath graph (1600) generates (e.g., in real time and/or in response to a decision to perform a particular operation at a particular node within the datapath graph) a cover, such as cover 1606, which is used to identify what logs and what parts of those logs make up a particular fragment. In this example, the cover (1600) includes a fragment field or identifier, which identifies which input fragment the cover relates to (in this example, the cover is for input fragment 2). The cover also includes identifier or fields which identify which source(s) the relevant log comes from, the specific log(s) from that identified source, and selection criteria to select appropriate data within the identified log (e.g., columns having particular values). In other words, the logs (1604) are not chopped up, reformatted, or otherwise processed in order to input fragments for storage on remote storage. Rather, the logs are stored in their original or raw form, and the appropriate parts of the logs (e.g., on remote storage 1602) are accessed when requested and sent to the datapath graph. Another way of saying this is that the input fragments are not pre-generated ahead of time on remote storage. Rather, when a datapath graph wants a particular input fragment, an appropriate cover is generated (e.g., by examining the sub-operation which will ingest the obtained or returned data) and sent to the remote storage so that the remote storage can retrieve and return the appropriate columns.

Since a given sub-operation only uses some of the data in a log, it is more efficient to only obtain some of the data using a cover as shown here. For example, instead of transferring an entire log, I/O resources, CPU resources, and/or network bandwidth resources may be preserved by only obtaining some of the data from the remote storage The following figure describes this example more formally and/or generally in a flowchart.

Figure 17:
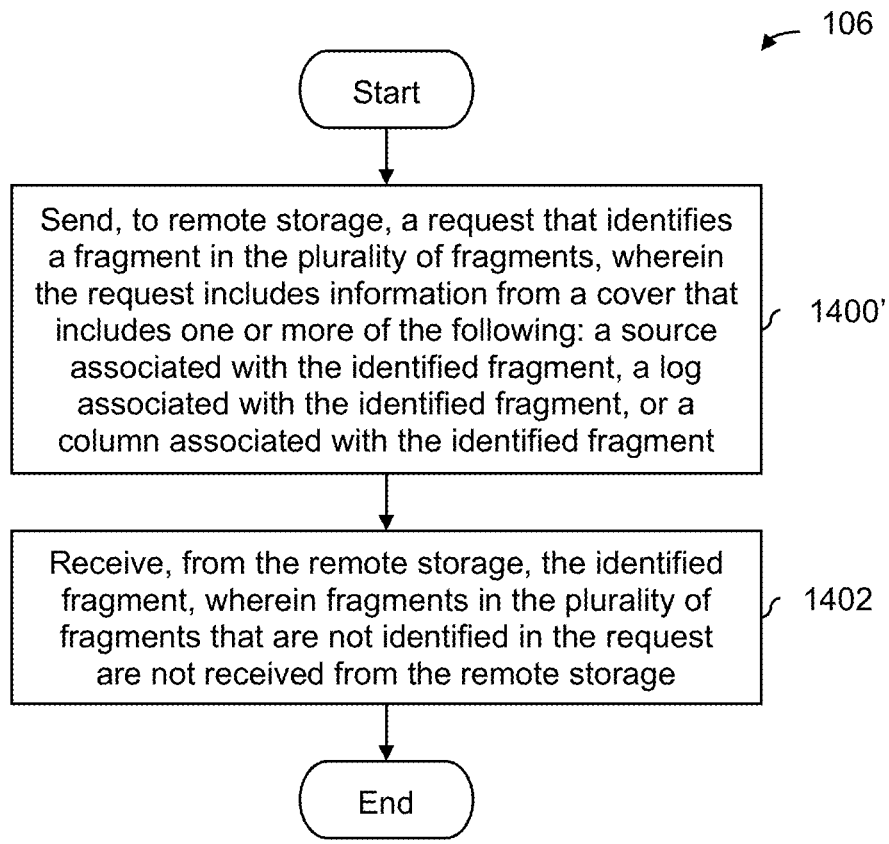
FIG. 17 is a flowchart illustrating an embodiment of a process to perform a plurality of sub-operations on a plurality of fragments, including by receiving at least one fragment from remote storage and using a cover.

FIG. 17 is a flowchart illustrating an embodiment of a process to perform a plurality of sub-operations on a plurality of fragments, including by receiving at least one fragment from remote storage and using a cover. In some embodiments, the process is used at step 106 in FIG. 1. FIG. 17 is similar to FIG. 14 and for convenience similar reference number are used to show related steps.

At 1400', a request that identifies a fragment in the plurality of fragments is sent to remote storage, wherein the request includes information from a cover that includes one or more of the following: a source associated with the identified fragment, a log associated with the identified fragment, or a column associated with the identified fragment. For example, datapath graph 1600 in FIG. 16 may access cover 1606 when requesting an input fragment from remote storage 1602.

At 1402, the identified fragment is received from the remote storage, wherein fragments in the plurality of fragments that are not identified in the request are not received from the remote storage. See, for example, diagram 1300 and diagram 1320 in FIG. 13 where the first input fragment (1314/1334) is not sent to the datapath graph (1306/1326).

Figure 18:
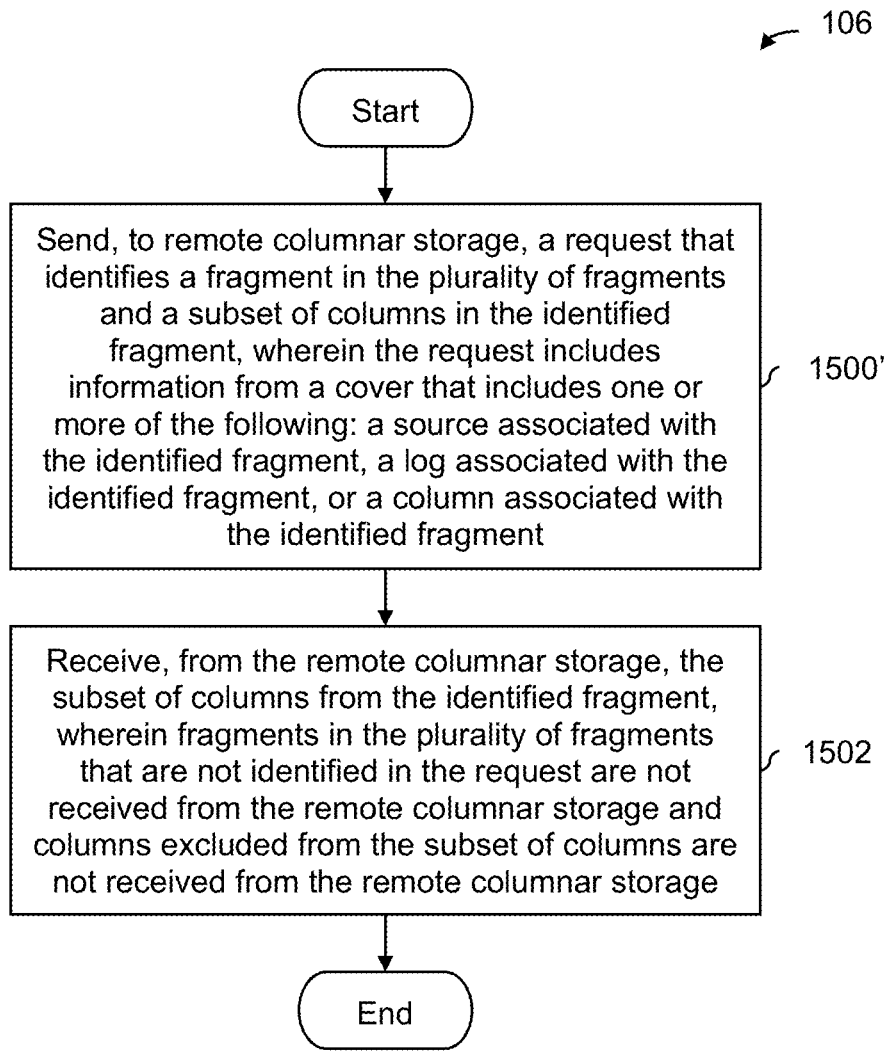
FIG. 18 is a flowchart illustrating an embodiment of a process to perform a plurality of sub-operations on a plurality of fragments, including by receiving at least one fragment from remote columnar storage and using a cover.

FIG. 18 is a flowchart illustrating an embodiment of a process to perform a plurality of sub-operations on a plurality of fragments, including by receiving at least one fragment from remote columnar storage and using a cover. In some embodiments, the process is used at step 106 in FIG. 1. FIG. 18 is similar to FIG. 15 and for convenience similar reference number are used to show related steps.

At 1500', a request that identifies a fragment in the plurality of fragments and a subset of columns in the identified fragment is sent to remote columnar storage, wherein the request includes information from a cover that includes one or more of the following: a source associated with the identified fragment, a log associated with the identified fragment, or a column associated with the identified fragment. For example, datapath graph 1600 in FIG. 16 may access cover 1606 when requesting an input fragment from remote storage 1602.

At 1502, the subset of columns from the identified fragment is received from the remote columnar storage, wherein fragments in the plurality of fragments that are not identified in the request are not received from the remote columnar storage and columns excluded from the subset of columns are not received from the remote columnar storage. See, for example, diagram 1300 in FIG. 13.

Returning briefly to FIG. 4, in that example, sub-operations 404, 406, and 408 have ranges with spans of 1 hour. The following figures describe some examples of how such a span may be determined. First, an example is described where the logs arrival at regular intervals (e.g., with respect to the dimension). Then, an example is described where the logs arrive at irregular intervals (e.g., with respect to the dimension).

FIG. 19 is a diagram illustrating an embodiment of a process to determine a span associated with a plurality of sub-operations. In some embodiments, the process of FIG. 19 is performed in combination with the process of FIG. 1 where the each of the sub-operations generated at step 104 in FIG. 1 has the same span (e.g., they all have a 1-hour span) and the span is determined per this process.

In this example, three logs (e.g., from one or more sources) are shown: a first log (1900), a second log (1910), and a third log (1920). For example, these logs may correspond to logs 212 in FIG. 2 which come from source 200. One of the columns in each log has already been selected to be the dimension and in this example it is the time information column (1902/1912/1922). For each log file, the span (in this case, the time span) of the dimension is determined by subtracting the earliest value in that column (1904/1914/1924) from the latest value in that column (1906/1916/1926). This results in time spans (not shown), all of which are approximately 1 hour: a first time span 59 minutes and 32 seconds, a second time span of 59 minutes and 45 seconds, and a third time span (1924) of 1 hour, 0 minutes, and 0 seconds. These time spans are averaged and rounded (not shown) to obtain spans of 1 hour. Returning briefly to FIG. 4, this may be how the system knows to generate sub-operations, each of which spans a 1-hour block.

From the 1-hour time span it can be determined when each sub-operation should begin and end by obtaining a remainder value (e.g., which only comprises minutes and seconds) using the 1-hour time span and either the earliest value in the columns (1904/1914/1924) or the latest values in the column (1906/1916/1926). Using the earliest value as an example, the remainders would be: 5 seconds, 6 seconds, and 59 minutes and 56 seconds (e.g., after dropping the hours place). Again, this may be averaged and/or rounded to obtain ranges that begin on the hour (e.g., 10:00, 11:00, 12:00, etc.) and end at the end of the hour (e.g., 10:59, 11:59, 12:59, etc.).

Having each of the sub-operations have equal spans which match the span of arriving logs may be attractive in some applications. For example, in FIG. 2, suppose that each of the logs (212) typically includes 1-hour chunks of information. Consequently, downstream input fragments (214) will also typically includes 1-hour chunks of information. As a result, most of the time when a new log (or, downstream, new input fragment) arrives, only one sub-operation needs to be run and only the newly arrived log (or, downstream, newly arrived input fragment) needs to be processed. Although sometimes a log or input fragment will contain delayed information (see delayed information 342 in FIG. 3) which causes two or more sub-operations and/or two or more input fragments to be processed, the number of affected sub-operations and/or input fragments is expected to be relatively low and the frequency of such an occurrence is expected to be low.

To put it another way, if the sub-operations are "wider" than the logs or input fragments, then previously processed input fragments will have to be processed again. For example, if a sub-operation is associated with the 10:00-12:00 range but the source information arrived in a 10 o'clock log and then an 11 o'clock log, then some downstream 10 o'clock input fragment would need to be downloaded and reprocessed when the 11 o'clock input fragment is received at that node. As described above, this may be undesirable.

If the sub-operations are "skinnier" than the logs or input fragments, then multiple sub-operations may need to be run each time a new log or input fragment is received. For example, suppose the sub-operations operate on half hour chunks but the logs or input fragments span 1 hour chunks of time. Each time a new log or input fragment is received, two sub-operations would need to be run. This may be an inefficient use of processing resources. For this reasons, using sub-operations with spans that match the logs and/or input fragments is desirable.

For convenience, it is assumed in this example that the "width" of the dimension (in this example, time) in each log or input fragment remains the same as information flows through the datapath graph. That is, it is assumed that the data travels down the datapath graph in spans of about an hour (e.g., there is no node which chops up the data into half hour blocks or 15 minute blocks). This means that any conclusions or decisions about the span and/or range made using the logs holds true throughout the datapath graph. Naturally, this may not hold in all cases. For example, the partition may change (e.g., going from time-based partitioning to user-based partitioning) and the width could change (e.g., going from one time-based partitioning to another time-based partitioning, but the "width").

In various embodiments, the example process is performed at various points or nodes throughout the pipeline or system. For example, as described above, if there is some node which changes the nominal or typical "width" of the dimension (e.g., as data progresses through the datapath graph) then it may be desirable to analyze the dimension after that point. Above that point, sub-operations with a shorter (longer) span may be used and below that point, sub-operations with longer (shorter) spans may be used. Or, some input fragments may aggregate or include data from multiple sources (e.g., one source may be associated with a manufacturer's own website which sells a product and other sources may be associated with retailers which sell that product). It may be desirable to analyze the dimension after information from all sources is available.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor; and
   a memory coupled with the processor, wherein the memory is configured to provide the processor with instructions which when executed cause the processor to:

receive an operation associated with an artifact which includes a plurality of fragments;
obtain a dimension;
generate a plurality of sub-operations including by dividing the operation along the dimension, wherein each of the plurality of sub-operations is associated with a subset of values associated with the dimension;
identify one or more sub-operations in the generated plurality of sub-operations that correspond to one or more fragments in the plurality of fragments; and
perform each sub-operation in the plurality of sub-operations on those corresponding one or more fragments without using non-corresponding fragments, including by:
generating, for each of the plurality of fragments, dimensional metadata which includes a subset of values associated with the dimension for that fragment;
performing a first sub-operation on a corresponding one or more fragments; and
subsequently performing a second sub-operation on a corresponding one or more fragments without re-rerunning the first sub-operation and without downloading the one or more fragments corresponding to the first sub-operation.

2. The system recited in claim 1, wherein the instructions for performing the plurality of sub-operations on the plurality of fragments include instructions for:
in response to receiving a fragment from the plurality of fragments, obtaining dimensional metadata which includes a subset of values associated with the dimension for the received fragment;
identifying which one or more of the plurality of sub-operations have a subset of values which overlaps with the dimensional metadata for the received fragment; and
performing the identified sub-operations on at least the received fragment.

3. The system recited in claim 1, wherein the instructions for obtaining the dimension include instructions for:
receiving, from an upstream node in a datapath graph, an identification of a column in the plurality of fragments that the upstream node is using as the dimension; and
using, at a downstream node in the datapath graph, the identified column as the dimension.

4. The system recited in claim 1, wherein the instructions for obtaining the dimension include instructions for:
receiving, from a user interface associated with a datapath graph, an identification of a column in the plurality of fragments to use as the dimension; and
using the identified column as the dimension.

5. The system recited in claim 1, wherein the instructions for obtaining the dimension include instructions for:
identifying a group by statement in the operation, wherein the group by statement includes one or more columns in the plurality of fragments; and
using one of the columns in the group by statement as the dimension.

6. The system recited in claim 1, wherein the instructions for obtaining the dimension include instructions for:
analyzing a plurality of columns in the plurality of fragments in order to generate a plurality of suitability metrics;
selecting one of the plurality of columns using the plurality of suitability metrics; and
using the selected column as the dimension.

7. The system recited in claim 1, wherein the instructions for obtaining the dimension include instructions for:
identifying a group by statement in the operation, wherein the group by statement includes one or more columns in the plurality of fragments; and
using one of the columns in the group by statement as the dimension, including by:
analyzing a plurality of columns in the plurality of fragments in order to generate a plurality of suitability metrics;
selecting one of the plurality of columns using the plurality of suitability metrics; and
using the selected column as the dimension.

8. The system recited in claim 1, wherein the instructions for obtaining the dimension include instructions for:
determining if a node is configured to receive the dimension from an upstream node;
in the event it is determined that the node is configured to receive the dimension from the upstream node:
receiving, from an upstream node in a datapath graph, an identification of a column in the plurality of fragments that the upstream node is using as the dimension; and
using, at a downstream node in the datapath graph, the identified column as the dimension; and
in the event it is determined that the node is not configured to receive the dimension from the upstream node:
determining if the node is configured to receive or determine the dimension;
in the event it is determined that the node is configured to receive the dimension:
receiving, from a user interface associated with a datapath graph, an identification of a column in the plurality of fragments to use as the dimension; and
using the identified column as the dimension; and
in the event it is determined that the node is configured to determine the dimension:
determining if a group by statement is available;
in the event it is determined that a group by statement is available:
identifying a group by statement in the operation, wherein the group by statement includes one or more columns in the plurality of fragments; and
using one of the columns in the group by statement as the dimension; and
in the event it is determined that a group by statement is no available:
analyzing a plurality of columns in the plurality of fragments in order to generate a plurality of suitability metrics;
selecting one of the plurality of columns using the plurality of suitability metrics; and
using the selected column as the dimension.

9. The system recited in claim 1, wherein the instructions for performing the plurality of sub-operations on the plurality of fragments include instructions for:
sending, to remote storage, a request that identifies a fragment in the plurality of fragments; and
receiving, from the remote storage, the identified fragment, wherein fragments in the plurality of fragments that are not identified in the request are not received from the remote storage.

10. The system recited in claim 1, wherein the instructions for performing the plurality of sub-operations on the plurality of fragments include instructions for:

sending, to remote columnar storage, a request that identifies a fragment in the plurality of fragments and a subset of columns in the identified fragment; and receiving, from the remote columnar storage, the subset of columns from the identified fragment, wherein fragments in the plurality of fragments that are not identified in the request are not received from the remote columnar storage and columns excluded from the subset of columns are not received from the remote columnar storage.

11. The system recited in claim 1, wherein the instructions for performing the plurality of sub-operations on the plurality of fragments include instructions for:

sending, to remote storage, a request that identifies a fragment in the plurality of fragments, wherein the request includes information from a cover that includes one or more of the following: a source associated with the identified fragment, a log associated with the identified fragment, or a column associated with the identified fragment; and receiving, from the remote storage, the identified fragment, wherein fragments in the plurality of fragments that are not identified in the request are not received from the remote storage.

12. The system recited in claim 1, wherein the instructions for performing the plurality of sub-operations on the plurality of fragments include instructions for:

sending, to remote columnar storage, a request that identifies a fragment in the plurality of fragments and a subset of columns in the identified fragment, wherein the request includes information from a cover that includes one or more of the following: a source associated with the identified fragment, a log associated with the identified fragment, or a column associated with the identified fragment; and receiving, from the remote columnar storage, the subset of columns from the identified fragment, wherein fragments in the plurality of fragments that are not identified in the request are not received from the remote columnar storage and columns excluded from the subset of columns are not received from the remote columnar storage.

13. A method, comprising:

receiving an operation associated with an artifact which includes a plurality of fragments;

obtaining a dimension;

generating a plurality of sub-operations including by dividing the operation along the dimension, wherein each of the plurality of sub-operations is associated with a subset of values associated with the dimension;

identify one or more sub-operations in the generated plurality of sub-operations that correspond to one or more fragments in the plurality of fragments; and performing each sub-operation in the plurality of sub-operations on those corresponding one or more fragments without using non-corresponding fragments, including by:

generating, for each of the plurality of fragments, dimensional metadata which includes a subset of values associated with the dimension for that fragment;

performing a first sub-operation on a corresponding one or more fragments; and subsequently performing a second sub-operation on a corresponding one or more fragments without rerunning the first sub-operation and without downloading the one or more fragments corresponding to the first sub-operation.

14. The method recited in claim 13, wherein performing the plurality of sub-operations on the plurality of fragments includes:

in response to receiving a fragment from the plurality of fragments, obtaining dimensional metadata which includes a subset of values associated with the dimension for the received fragment;

identifying which one or more of the plurality of sub-operations have a subset of values which overlaps with the dimensional metadata for the received fragment; and performing the identified sub-operations on at least the received fragment.

15. The method recited in claim 13, wherein obtaining the dimension includes:

receiving, from an upstream node in a datapath graph, an identification of a column in the plurality of fragments that the upstream node is using as the dimension; and using, at a downstream node in the datapath graph, the identified column as the dimension.

16. The method recited in claim 13, wherein obtaining the dimension includes:

receiving, from a user interface associated with a datapath graph, an identification of a column in the plurality of fragments to use as the dimension; and using the identified column as the dimension.

17. The method recited in claim 13, wherein obtaining the dimension includes:

identifying a group by statement in the operation, wherein the group by statement includes one or more columns in the plurality of fragments; and using one of the columns in the group by statement as the dimension.

18. The method recited in claim 13, wherein obtaining the dimension includes:

analyzing a plurality of columns in the plurality of fragments in order to generate a plurality of suitability metrics;

selecting one of the plurality of columns using the plurality of suitability metrics; and using the selected column as the dimension.

19. The method recited in claim 13, wherein obtaining the dimension includes:

identifying a group by statement in the operation, wherein the group by statement includes one or more columns in the plurality of fragments; and using one of the columns in the group by statement as the dimension, including by:

analyzing a plurality of columns in the plurality of fragments in order to generate a plurality of suitability metrics;

selecting one of the plurality of columns using the plurality of suitability metrics; and using the selected column as the dimension.

20. The method recited in claim 13, wherein obtaining the dimension includes:

determining if a node is configured to receive the dimension from an upstream node;

in the event it is determined that the node is configured to receive the dimension from the upstream node:

receiving, from an upstream node in a datapath graph, an identification of a column in the plurality of fragments that the upstream node is using as the dimension; and using, at a downstream node in the datapath graph, the identified column as the dimension; and in the event it is determined that the node is not configured to receive the dimension from the upstream node:
  determining if the node is configured to receive or determine the dimension;
  in the event it is determined that the node is configured to receive the dimension:
    receiving, from a user interface associated with a datapath graph, an identification of a column in the plurality of fragments to use as the dimension; and
    using the identified column as the dimension; and
  in the event it is determined that the node is configured to determine the dimension:
    determining if a group by statement is available;
    in the event it is determined that a group by statement is available:
      identifying a group by statement in the operation, wherein the group by statement includes one or more columns in the plurality of fragments; and
      using one of the columns in the group by statement as the dimension; and
    in the event it is determined that a group by statement is no available:
      analyzing a plurality of columns in the plurality of fragments in order to generate a plurality of suitability metrics;
      selecting one of the plurality of columns using the plurality of suitability metrics; and
    using the selected column as the dimension.

21. The method recited in claim 13, wherein performing the plurality of sub-operations on the plurality of fragments includes:
  sending, to remote storage, a request that identifies a fragment in the plurality of fragments; and
  receiving, from the remote storage, the identified fragment, wherein fragments in the plurality of fragments that are not identified in the request are not received from the remote storage.

22. The method recited in claim 13, wherein performing the plurality of sub-operations on the plurality of fragments includes:
  sending, to remote columnar storage, a request that identifies a fragment in the plurality of fragments and a subset of columns in the identified fragment; and
  receiving, from the remote columnar storage, the subset of columns from the identified fragment, wherein fragments in the plurality of fragments that are not identified in the request are not received from the remote columnar storage and columns excluded from the subset of columns are not received from the remote columnar storage.

23. The method recited in claim 13, wherein performing the plurality of sub-operations on the plurality of fragments includes:
  sending, to remote storage, a request that identifies a fragment in the plurality of fragments, wherein the request includes information from a cover that includes one or more of the following: a source associated with the identified fragment, a log associated with the identified fragment, or a column associated with the identified fragment; and
  receiving, from the remote storage, the identified fragment, wherein fragments in the plurality of fragments that are not identified in the request are not received from the remote storage.

24. The method recited in claim 13, wherein performing the plurality of sub-operations on the plurality of fragments includes:
  sending, to remote columnar storage, a request that identifies a fragment in the plurality of fragments and a subset of columns in the identified fragment, wherein the request includes information from a cover that includes one or more of the following: a source associated with the identified fragment, a log associated with the identified fragment, or a column associated with the identified fragment; and
  receiving, from the remote columnar storage, the subset of columns from the identified fragment, wherein fragments in the plurality of fragments that are not identified in the request are not received from the remote columnar storage and columns excluded from the subset of columns are not received from the remote columnar storage.

25. A computer program product, the computer program product being embodied in a non-transitory computer readable storage medium and comprising computer instructions for:
  receiving an operation associated with an artifact which includes a plurality of fragments;
  obtaining a dimension;
  generating a plurality of sub-operations including by dividing the operation along the dimension, wherein each of the plurality of sub-operations is associated with a subset of values associated with the dimension;
  identify one or more sub-operations in the generated plurality of sub-operations that correspond to one or more fragments in the plurality of fragments; and
  performing each sub-operation in the plurality of sub-operations on those corresponding one or more fragments without using non-corresponding fragments, including by:
    generating, for each of the plurality of fragments, dimensional metadata which includes a subset of values associated with the dimension for that fragment;
    performing a first sub-operation on a corresponding one or more fragments; and
    subsequently performing a second sub-operation on a corresponding one or more fragments without re-rerunning the first sub-operation and without downloading the one or more fragments corresponding to the first sub-operation.

* * * * *

UNITED STATES PATENT AND TRADEMARK OFFICE
CERTIFICATE OF CORRECTION

PATENT NO. : 10,725,787 B1
APPLICATION NO. : 15/824596
DATED : July 28, 2020
INVENTOR(S) : Steven M. Parkes et al.

Page 1 of 1

It is certified that error appears in the above-identified patent and that said Letters Patent is hereby corrected as shown below:

In the Specification

In Column 3, Line(s) 12, after "time", delete "to" and insert --t0--, therefor.
In Column 3, Line(s) 13, delete "ti" and insert --t1--, therefor.

Signed and Sealed this
Fourth Day of May, 2021

Drew Hirshfeld
*Performing the Functions and Duties of the
Under Secretary of Commerce for Intellectual Property and
Director of the United States Patent and Trademark Office*